(12) United States Patent
Chang et al.

(10) Patent No.: US 12,348,352 B2
(45) Date of Patent: Jul. 1, 2025

(54) METHOD AND APPARATUS FOR RADIO SIGNAL TRANSMISSION AND RECEPTION IN COMMUNICATION SYSTEM

(71) Applicant: ELECTRONICS AND TELECOMMUNICATIONS RESEARCH INSTITUTE, Daejeon (KR)

(72) Inventors: Kapseok Chang, Daejeon (KR); Yong Sun Kim, Daejeon (KR); Won Cheol Cho, Daejeon (KR); Young-Jo Ko, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 85 days.

(21) Appl. No.: 18/080,909

(22) Filed: Dec. 14, 2022

(65) Prior Publication Data

US 2023/0188405 A1    Jun. 15, 2023

(30) Foreign Application Priority Data

Dec. 15, 2021    (KR) .................. 10-2021-0180113
Dec. 14, 2022    (KR) .................. 10-2022-0174509

(51) Int. Cl.
*H04L 27/36*    (2006.01)
*H04L 27/34*    (2006.01)

(52) U.S. Cl.
CPC ........ *H04L 27/362* (2013.01); *H04L 27/3444* (2013.01)

(58) Field of Classification Search
CPC ..................... H04L 27/362; H04L 27/3444
See application file for complete search history.

(56) References Cited

U.S. PATENT DOCUMENTS

| | | | |
|---|---|---|---|
| 7,924,808 B2 | 4/2011 | Han et al. | |
| 8,705,658 B2 | 4/2014 | Seo et al. | |
| 9,407,486 B2 | 8/2016 | Chang et al. | |
| 2010/0150577 A1* | 6/2010 | Essiambre | H04B 10/5053 375/308 |
| 2010/0239038 A1* | 9/2010 | Seyedi-Esfahani | H04L 27/3411 375/261 |
| 2013/0022017 A1 | 1/2013 | Han et al. | |
| 2013/0259013 A1 | 10/2013 | Malladi et al. | |
| 2019/0097856 A1 | 3/2019 | Kim et al. | |
| 2019/0222461 A1* | 7/2019 | Atungsiri | H04L 27/3444 |

* cited by examiner

*Primary Examiner* — Janice N Tieu
(74) *Attorney, Agent, or Firm* — LRK PATENT LAW FIRM

(57) ABSTRACT

An operation method of a first communication node in a communication system may include: generating a base sequence; performing a quadrature phase shift keying (QPSK) operation on the base sequence; generating a first signal sequence by performing a rotational transform operation by a first angle on a complex plane with respect to a result of the QPSK operation; modulating the first signal sequence to generate first modulation symbols; and transmitting a first signal composed of the first modulation symbols to a second communication node, wherein each of a plurality of elements constituting the first signal sequence has a real value or a pure imaginary value.

14 Claims, 12 Drawing Sheets

AQPSK: $\pi/4$ angle shift

AQPSK: $-\pi/4$ angle shift

METHOD AND APPARATUS FOR RADIO SIGNAL TRANSMISSION AND RECEPTION IN COMMUNICATION SYSTEM

CROSS-REFERENCE TO RELATED APPLICATIONS

This application claims priority to Korean Patent Applications No. 10-2021-0180113, filed on Dec. 15, 2021, and No. 10-2022-0174509, filed on Dec. 14, 2022, with the Korean Intellectual Property Office (KIPO), the entire contents of which are hereby incorporated by reference.

BACKGROUND

1. Technical Field

Exemplary embodiments of the present disclosure relate to a technique for radio signal transmission and reception in a communication system, and more particularly, to a technique for improving transmission/reception performance of radio signals in a communication system.

2. Description of Related Art

With the development of information and communication technology, various wireless communication technologies are being developed. Representative wireless communication technologies include long term evolution (LTE) and new radio (NR) defined as the $3^{rd}$ generation partnership project (3GPP) standards. The LTE may be one of $4^{th}$ generation (4G) wireless communication technologies, and the NR may be one of $5^{th}$ generation (5G) wireless communication technologies. A wireless communication technology after the 5G wireless communication technology (e.g., the sixth generation (6G) wireless communication technology, etc.) may be referred to as 'beyond-5G (B5G) wireless communication technology'.

In a communication system supporting coherent transmission and reception, when a transmitting node transmits data to a receiving node, a signal for estimation known in advance (hereinafter, 'estimation signal' or 'reference signal') is transmitted together with the data between the transmitting node and the receiving node. The receiving node may perform estimation based on the estimation signal received along with the data. Here, the estimation based on the estimation signal may mean, for example, estimation on a radio channel, phase noise, timing, and/or the like experienced by the received data. The receiving node may perform compensations for the received data through the estimation operation based on the estimation signal. The estimation based on the estimation signal may mean estimation (or positioning) of a position of the receiving node (or a receiver of the receiving node). Meanwhile, the transmitting node may transmit a radio signal including signaling information or data to the receiving node. The receiving node may obtain the signaling information or data through a restoration (or demodulation) operation based on the radio signal. Techniques for improving the performance of such the estimation operation or restoration operation in the communication system are required.

Matters described as the prior arts are prepared to help understanding of the background of the present disclosure, and may include matters that are not already known to those of ordinary skill in the technology domain to which exemplary embodiments of the present disclosure belong.

SUMMARY

Exemplary embodiments of the present disclosure provide a method and an apparatus for radio signal transmission and reception, which can reduce complexity of calculation for an estimation operation or restoration operation based on radio signals and improve the performance of the estimation operation or restoration operation.

According to a first exemplary embodiment of the present disclosure, An operation method of a first communication node in a communication system may comprise: generating a base sequence; performing a quadrature phase shift keying (QPSK) operation on the base sequence; generating a first signal sequence by performing a rotational transform operation by a first angle on a complex plane with respect to a result of the QPSK operation; modulating the first signal sequence to generate first modulation symbols; and transmitting a first signal composed of the first modulation symbols to a second communication node, wherein each of a plurality of elements constituting the first signal sequence has a real value or a pure imaginary value.

The generating of the first signal sequence may comprise: performing an operation of multiplying a QPSK sequence obtained as the result of the QPSK operation by a first rotational transform coefficient corresponding to the first angle; and obtaining the first signal sequence composed of the plurality of elements each having a real value 1 or −1 or a pure imaginary value j or −j as a result of the operation of multiplying the first rotational transform coefficient.

The first signal may correspond to a reference signal for an estimation operation in the second communication node, and the base sequence may correspond to a binary pseudo-noise (PN) sequence defined based on a modulo operation between a first index related to indexes of subcarriers to which the first modulation symbols are mapped and a first estimation target variable.

The first signal may correspond to a reference signal for an estimation operation in the second communication node, and the generating of the base sequence may comprise: generating first and second binary sequences that are binary pseudo noise (PN) sequences; performing an element-wise exclusive-OR (XOR) operation on the first and second binary sequences; and obtaining the base sequence corresponding to a result of the element-wise XOR operation, wherein the first binary sequence corresponds to a binary PN sequence defined based on a modulo operation between a first index related to indexes of subcarriers to which the first modulation symbols are mapped and a first estimation target variable, and the second binary sequence corresponds to a binary PN sequence defined based on a modulo operation between the first index and a second estimation target variable.

The first angle may be one of $\pi/4$, $-\pi/4$, $3\pi/4$, or $-3\pi/4$.

According to a second exemplary embodiment of the present disclosure, an operation method of a first communication node in a communication system may comprise: generating first and second base sequences; performing a quadrature phase shift keying (QPSK) operation on each of the first and second base sequences; generating first and second intermediate sequences by performing a rotational transform operation by a first angle on a complex plane with respect to a result of the QPSK operation; performing a first operation on the first and second intermediate sequences to generate a first signal sequence; modulating the first signal sequence to generate first modulation symbols; and transmitting a first signal composed of the first modulation symbols to a second communication node, wherein each of a plurality of elements constituting the first signal sequence has a real value or a pure imaginary value.

The generating of the first and second intermediate signal sequences may comprise: performing an operation of multiplying QPSK sequences obtained as the result of the QPSK operation by a first rotational transform coefficient corresponding to the first angle; and obtaining the first and second intermediate sequences each composed of a plurality of elements each having a real value 1 or −1 or a pure imaginary value j or −j as a result of the operation of multiplying the first rotational transform coefficient.

Each of the first and second intermediate sequences may be composed of a plurality of elements each having a real value 1 or −1 or a pure imaginary value j or j, and the generating of the first signal sequence may comprise: performing an element-wise multiplication operation on the first and second intermediate sequences; and obtaining the first signal sequence corresponding to a result of the element-wise multiplication operation.

The generating of the first and second base sequences may comprise: generating the first base sequence defined based on a first intermediate index; and generating the second base sequence defined based on a second intermediate index, wherein a first signal index for identifying the first signal sequence is determined based on a linear combination of the first and second intermediate indexes.

The generating of the first and second base sequences may comprise: generating the first base sequence based on first and second binary sequences; and generating the second base sequence based on third and fourth binary sequences, wherein all of the first to fourth binary sequences are different from each other.

The generating of the first and second base sequences may comprise: generating the first base sequence based on first and second binary sequences; and generating the second base sequence based on third and fourth binary sequences, wherein at least part of the first to fourth binary sequences are identical to each other.

According to a third exemplary embodiment of the present disclosure, a first communication node comprising a processor may be provided. The processor may cause the first communication node to perform: generating one or more binary sequences based on information to be transmitted to a second communication node; performing a quadrature phase shift keying (QPSK) operation on each of the one or more binary sequences; generating a first signal sequence based on a rotational transform operation by a first angle on a complex plane with respect to a result of the QPSK operation; modulating the first signal sequence to generate first modulation symbols; and transmitting a first signal composed of the first modulation symbols to a second communication node, wherein each of a plurality of elements constituting the first signal sequence has a real value or a pure imaginary value.

The number of the one or more binary sequences may be one, and in the generating of the first signal sequence, the processor may cause the first communication node to perform: performing an operation of multiplying a QPSK sequence obtained as the result of the QPSK operation on the one binary sequence by a first rotational transform coefficient corresponding to the first angle; and obtaining the first signal sequence composed of a plurality of elements each having a real value 1 or −1 or a pure imaginary value j or −j as a result of the operation of multiplying the first rotational transform coefficient.

The one or more binary sequences may include first and second binary sequences, and in the generating of the first signal sequence, the processor may cause the first communication node to perform: performing an operation of multiplying each of QPSK sequences obtained as the result of the QPSK operation on the first and second binary sequences by a first rotational transform coefficient corresponding to the first angle; and obtaining first and second intermediate sequences each composed of a plurality of elements each having a real value 1 or −1 or a pure imaginary value j or −j as a result of the operation of multiplying the first rotational transform coefficient.

Each of the first and second intermediate sequences may be composed of a plurality of elements each having a real value 1 or −1 or a pure imaginary value j or j, and in the generating of the first signal sequence, the processor may cause the first communication node to perform: performing an element-wise multiplication operation on the first and second intermediate sequences; and obtaining the first signal sequence corresponding to a result of the element-wise multiplication operation.

According to the exemplary embodiments of the present disclosure, the performance of the estimation operation or restoration operation based on radio signals transmitted and received between the transmitting node and the receiving node can be significantly improved. The receiving node receiving a radio signal can perform the estimation or restoration operation based on the radio signal without complex multiplication operations, and accordingly, complexity of calculations for the estimation or restoration operation can be reduced. According to the exemplary embodiments of the present disclosure, the total number of discriminable estimation signals may increase relative to a base sequence length. Further, the estimation signal according to the exemplary embodiments of the present disclosure has an advantage in terms of a peak to average power ratio (PAPR).

DETAILED DESCRIPTION OF THE EMBODIMENTS

Figure 1:
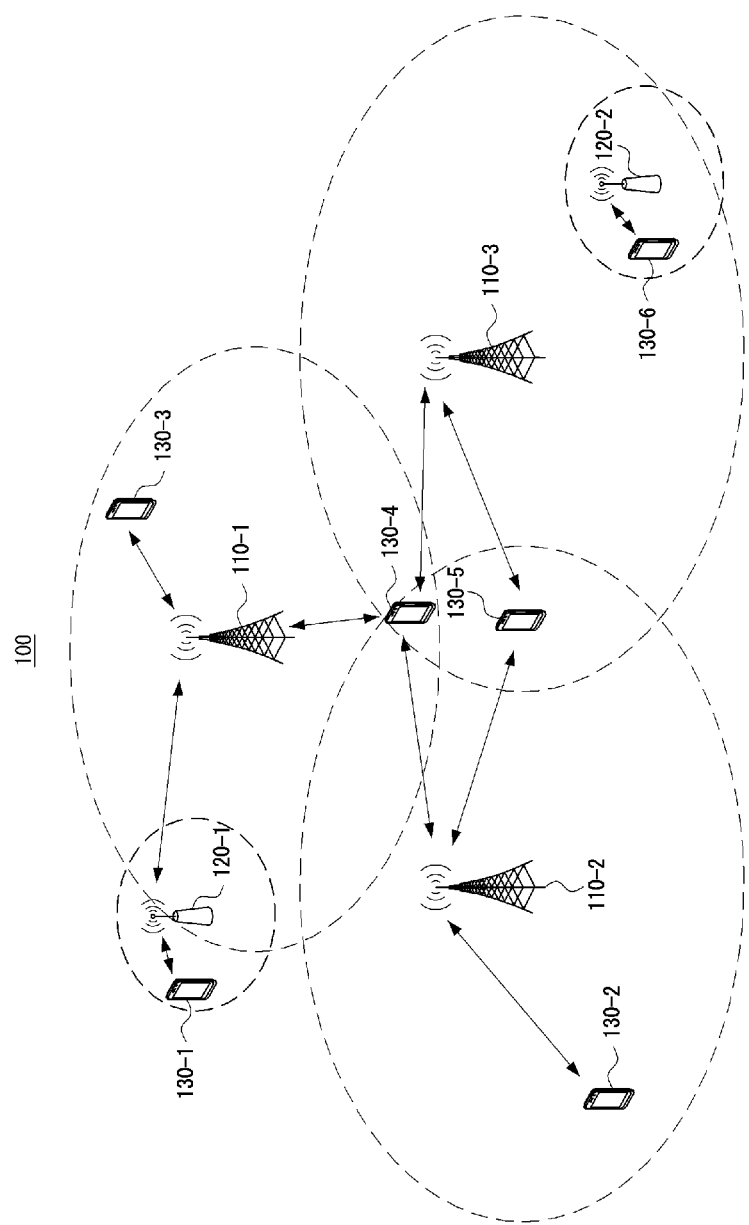
FIG. 1 is a conceptual diagram illustrating an exemplary embodiment of a communication system.

Exemplary embodiments of the present disclosure are disclosed herein. However, specific structural and functional details disclosed herein are merely representative for purposes of describing exemplary embodiments of the present disclosure. Thus, exemplary embodiments of the present disclosure may be embodied in many alternate forms and should not be construed as limited to exemplary embodiments of the present disclosure set forth herein.

Accordingly, while the present disclosure is capable of various modifications and alternative forms, specific exemplary embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular exemplary embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may have the same meaning as a communication network.

Throughout the present disclosure, a network may include, for example, a wireless Internet such as wireless fidelity (WiFi), mobile Internet such as a wireless broadband Internet (WiBro) or a world interoperability for microwave access (WiMax), 2G mobile communication network such as a global system for mobile communication (GSM) or a code division multiple access (CDMA), 3G mobile communication network such as a wideband code division multiple access (WCDMA) or a CDMA2000, 3.5G mobile communication network such as a high speed downlink packet access (HSDPA) or a high speed uplink packet access (HSUPA), 4G mobile communication network such as a long term evolution (LTE) network or an LTE-Advanced network, 5G mobile communication network, or the like.

Throughout the present disclosure, a terminal may refer to a mobile station, mobile terminal, subscriber station, portable subscriber station, user equipment, access terminal, or the like, and may include all or a part of functions of the terminal, mobile station, mobile terminal, subscriber station, mobile subscriber station, user equipment, access terminal, or the like.

Here, a desktop computer, laptop computer, tablet PC, wireless phone, mobile phone, smart phone, smart watch, smart glass, e-book reader, portable multimedia player (PMP), portable game console, navigation device, digital camera, digital multimedia broadcasting (DMB) player, digital audio recorder, digital audio player, digital picture recorder, digital picture player, digital video recorder, digital video player, or the like having communication capability may be used as the terminal.

Throughout the present specification, the base station may refer to an access point, radio access station, node B (NB), evolved node B (eNB), base transceiver station, mobile multihop relay (MMR)-BS, or the like, and may include all or part of functions of the base station, access point, radio access station, NB, eNB, base transceiver station, MMR-BS, or the like.

Hereinafter, preferred exemplary embodiments of the present disclosure will be described in more detail with reference to the accompanying drawings. In describing the present disclosure, in order to facilitate an overall understanding, the same reference numerals are used for the same elements in the drawings, and duplicate descriptions for the same elements are omitted.

FIG. 1 is a conceptual diagram illustrating an exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. The plurality of communication nodes may support 4th generation (4G) communication (e.g., long term evolution (LTE), LTE-advanced (LTE-A)), 5th generation (5G) communication (e.g., new radio (NR)), or the like. The 4G communication may be performed in a frequency band of 6 gigahertz (GHz) or below, and the 5G communication may be performed in a frequency band of 6 GHz or above.

For example, for the 4G and 5G communications, the plurality of communication nodes may support a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, a filtered OFDM based communication protocol, a cyclic prefix OFDM (CP-OFDM) based communication protocol, a discrete Fourier transform spread OFDM (DFT-s-OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, a generalized frequency division multiplexing (GFDM) based communication protocol, a filter bank multi-carrier (FBMC) based communication protocol, a universal filtered multi-carrier (UFMC) based communication protocol, a space division multiple access (SDMA) based communication protocol, or the like.

In addition, the communication system 100 may further include a core network. When the communication system 100 supports the 4G communication, the core network may comprise a serving gateway (S-GW), a packet data network (PDN) gateway (P-GW), a mobility management entity (MME), and the like. When the communication system 100 supports the 5G communication, the core network may comprise a user plane function (UPF), a session management function (SMF), an access and mobility management function (AMF), and the like.

Meanwhile, each of the plurality of communication nodes 110-1, 110-2, 110-3, 120-1, 120-2, 130-1, 130-2, 130-3, 130-4, 130-5, and 130-6 constituting the communication system 100 may have the following structure.

Figure 2:
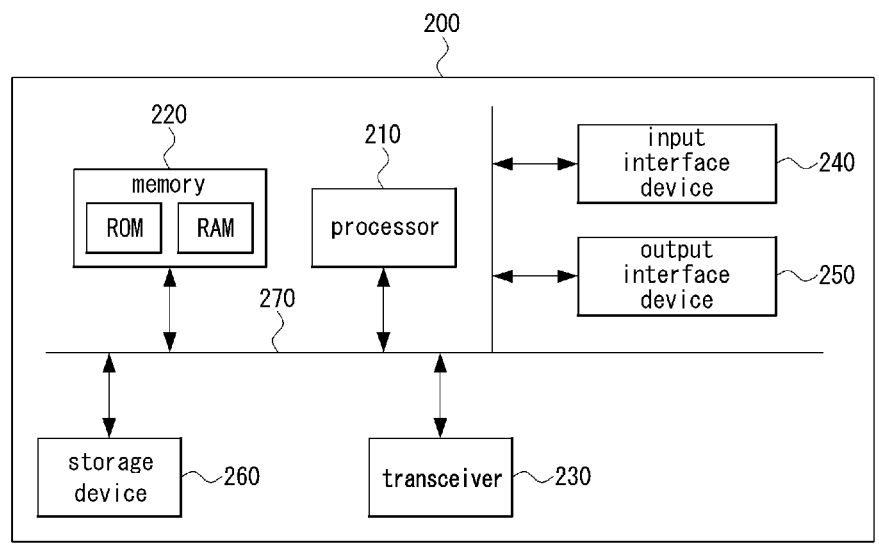
FIG. 2 is a block diagram illustrating an exemplary embodiment of a communication node constituting a communication system.

FIG. 2 is a block diagram illustrating an exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. The communication system 100 including the base stations 110-1, 110-2, 110-3, 120-1, and 120-2 and the terminals 130-1, 130-2, 130-3, 130-4, 130-5, and 130-6 may be referred to as an 'access network'. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, a evolved Node-B (eNB), a base transceiver station (BTS), a radio base station, a radio transceiver, an access point, an access node, a road side unit (RSU), a radio remote head (RRH), a transmission point (TP), a transmission and reception point (TRP), an eNB, a gNB, or the like.

Here, each of the plurality of terminals 130-1, 130-2, 130-3, 130-4, 130-5, and 130-6 may refer to a user equipment (UE), a terminal, an access terminal, a mobile terminal, a station, a subscriber station, a mobile station, a portable subscriber station, a node, a device, an Internet of things (IoT) device, a mounted apparatus (e.g., a mounted module/device/terminal or an on-board device/terminal, etc.), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

In addition, each of the plurality of base stations 110-1, 110-2, 110-3, 120-1, and 120-2 may support multi-input multi-output (MIMO) transmission (e.g., a single-user MIMO (SU-MIMO), multi-user MIMO (MU-MIMO), massive MIMO, or the like), coordinated multipoint (CoMP) transmission, carrier aggregation (CA) transmission, transmission in an unlicensed band, device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2, and operations supported by the plurality of base stations 110-1, 110-2, 110-3, 120-1, and 120-2. For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Hereinafter, radio signal transmission and reception methods in a communication system will be described. Even when a method (e.g., transmission or reception of a data packet) performed at a first communication node among communication nodes is described, the corresponding second communication node may perform a method (e.g., reception or transmission of the data packet) corresponding to the method performed at the first communication node. That is, when an operation of a receiving node is described, a corresponding transmitting node may perform an operation corresponding to the operation of the receiving node. Conversely, when an operation of a transmitting node is described, a corresponding receiving node may perform an operation corresponding to the operation of the transmitting node.

Figure 3:
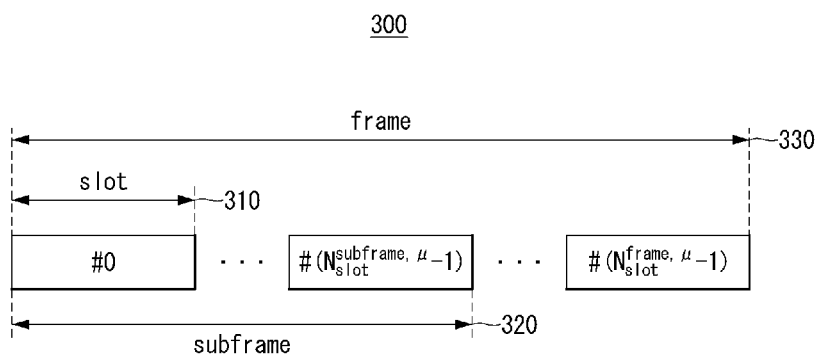
FIG. 3 is a conceptual diagram illustrating an exemplary embodiment of a structure of a radio frame in a communication system.

FIG. 3 is a conceptual diagram illustrating an exemplary embodiment of a structure of a radio frame in a communication system.

Referring to FIG. 3, in the communication system, one radio frame may consist of 10 subframes, and one subframe may consist of 2 time slots. One time slot may have a plurality of symbols in the time domain and may include a plurality of subcarriers in the frequency domain. The plurality of symbols in the time domain may be OFDM symbols. For convenience, an exemplary embodiment of a radio frame structure in the communication system will be described below using an OFDM transmission mode in which the plurality of symbols in the time domain are OFDM symbols as an example. However, this is only an example for convenience of description, and exemplary embodiments of the radio frame structure in the communication system are not limited thereto. For example, various exemplary embodiments of the radio frame structure in the communication system may be configured to support other transmission modes, such as a single carrier (SC) transmission mode.

In a communication system to which the 5G communication technology, etc. is applied, one or more of numerologies of Table 1 may be used in accordance with various purposes, such as inter-carrier interference (ICI) reduction according to frequency band characteristics, latency reduction according to service characteristics, and the like.

TABLE 1

| μ | Δf = $2^\mu \cdot 15$ [kHz] | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |

Referring to FIG. 3, time resources in which radio signals are transmitted in a communication system 300 may be represented with a frame 320 comprising one or more ($N_{slot}^{frame,\mu}/N_{slot}^{subframe,\mu}$) subframes, a subframe 320 comprising one or more ($N_{slot}^{subframe,\mu}$) slots, and a slot 310 comprising 14 ($N_{symb}^{slot}$) OFDM symbols. In this case, according to a configured numerology, as the values of $N_{symb}^{slot}$, $N_{slot}^{subframe,\mu}$, and $N_{slot}^{frame,\mu}$, values according to Table 2 below may be used in case of a normal CP, and values according to Table 3 below may be used in case of an extended CP. The OFDM symbols included within one slot may be classified into 'downlink', 'flexible', or 'uplink' by higher layer signaling or a combination of higher layer signaling and L1 signaling.

TABLE 2

| μ | $N_{symb}^{slot}$ | $N_{slot}^{frame,\mu}$ | $N_{slot}^{subframe,\mu}$ |
| --- | --- | --- | --- |
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 3

| μ | $N_{symb}^{slot}$ | $N_{slot}^{frame,\mu}$ | $N_{slot}^{subframe,\mu}$ |
| --- | --- | --- | --- |
| 2 | 12 | 40 | 4 |

In an exemplary embodiment of a communication system, the frame 330 may have a length of 10 ms, and the subframe 320 may have a length of 1 ms. Each frame 330 may be divided into two half-frames having the same length, and the first half-frame (i.e., half-frame 0) may be composed of subframes #0 to #4, and the second half-frame (i.e., half-frame 1) may be composed of subframes #5 to #9. One carrier may include a set of frames for uplink (i.e., uplink frames) and a set of frames for downlink (i.e., downlink frames).

One slot may have 6 (i.e., extended cyclic prefix (CP) case) or 7 (i.e., normal CP case) OFDM symbols. A time-frequency region defined by one slot may be referred to as a resource block (RB). When one slot has 7 OFDM symbols, one subframe may have 14 OFDM symbols (i.e., 1= 0, 1, 2, . . . , 13).

The subframe may be divided into a control region and a data region. A physical downlink control channel (PDCCH) may be allocated to the control region. A physical downlink shared channel (PDSCH) may be allocated to the data region. Some of the subframes may be special subframes. The special subframe may include a downlink pilot time slot (DwPTS), a guard period (GP), and an uplink pilot time slot (UpPTS). The DwPTS may be used for time and frequency synchronization estimation and cell search of the terminal. The GP may be a period for avoiding interferences caused by multipath delays of downlink signals.

In a communication system supporting coherent transmission and reception, when a transmitting node transmits data to a receiving node, a signal for estimation known in advance (hereinafter, 'estimation signal' or 'reference signal') is transmitted together with the data between the transmitting node and the receiving node. The receiving node may perform estimation based on the estimation signal received along with the data. For example, the data and/or estimation signal may be allocated to a frame 330, a subframe 320, a slot 310, and the like of a signal transmitted from the transmitting node to the receiving node.

The receiving node may perform estimation based on the estimation signal received along with the data. Here, the estimation based on the estimation signal may mean, for example, estimation on a radio channel, phase noise, timing, and/or the like experienced by the received data. The receiving node may perform compensations for the received data through the estimation operation based on the estimation signal. The estimation based on the estimation signal may mean estimation (or positioning) of a position of the receiving node (or a receiver of the receiving node). Techniques for improving the performance of such the estimation operation or restoration operation in the communication system are required.

In an exemplary embodiment of the communication system, the estimation signal may consist of one or more sequences. One or more sequences constituting the estimation signal may be arranged in the frame 330, subframe 320, slot 310, or OFDM symbols constituting the slot 310 in the time domain. Meanwhile, the one or more sequences constituting the estimation signal may be modulated and mapped to a plurality of subcarriers in the frequency domain. In an exemplary embodiment of the communication system, the one or more sequences constituting the estimation signal may be generated based on one or more base sequences. Here, the one or more base sequences may be configured as binary sequences, complex sequences, and/or the like.

Figure 4:
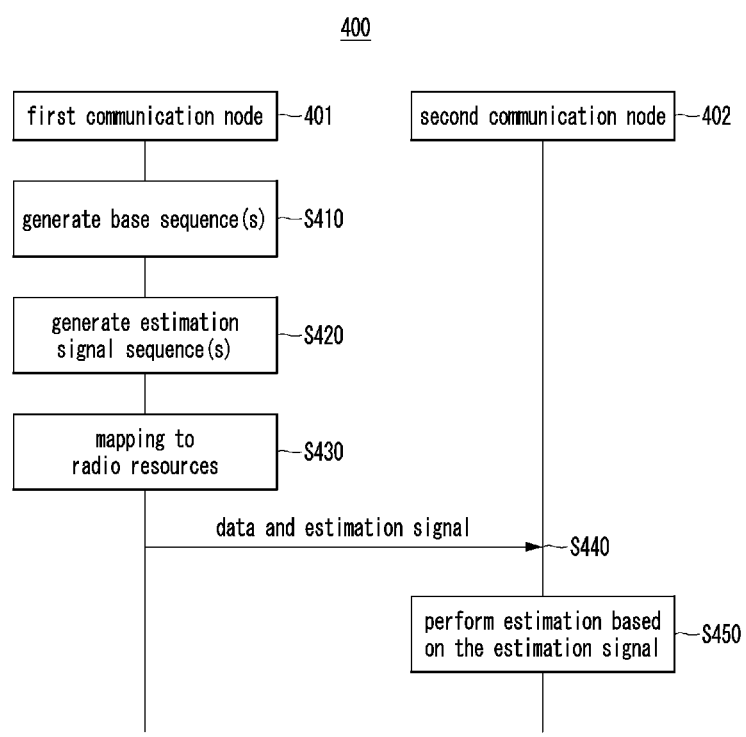
FIG. 4 is a sequence chart for describing an exemplary embodiment of a signal transmission and reception method in a communication system.

FIG. 4 is a sequence chart for describing an exemplary embodiment of a signal transmission and reception method in a communication system.

Referring to FIG. 4, a communication system 400 may include a plurality of communication nodes. For example, the communication system 400 may include at least a first communication node 401 and a second communication node 402. The first communication node 401 may be the same as or similar to the transmitting node that transmits the estimation signal described with reference to FIG. 3. The second communication node 402 may be the same as or similar to the receiving node that receives the estimation signal. Hereinafter, in describing an exemplary embodiment of the signal transmission and reception method in the communication system with reference to FIG. 4, descriptions overlapping those described with reference to FIGS. 1 to 3 may be omitted.

In an exemplary embodiment of the communication system 400, when the first communication node 401 transmits data to the second communication node 402, an estimation signal may be transmitted together with the data. The estimation signal may be composed of one or more sequences (hereinafter, one or more estimation signal sequences). The second communication node 402 may perform estimation based on the estimation signal received along with the data.

Specifically, the first communication node 401 may generate one or more base sequences (S410). Each of the one or more base sequences may correspond to a binary sequence or a complex sequence. The first communication node 401 may generate one or more estimation signal sequences based on the one or more base sequences (S420).

The first communication node 401 may modulate the one or more estimation signal sequences generated in the step S420, and allocate (or map) them to radio resources (S430). For example, the first communication node 401 may modulate the one or more generated estimation signal sequences to generate one or more modulation symbols. The first communication node 401 may allocate the generated one or more modulation symbols onto time resources and/or frequency resources.

The first communication node 401 may transmit an estimation signal composed of the one or more estimation signal sequences modulated and mapped to radio resources to the second communication node 402 (S440). In other words, the first communication node 401 may transmit, to the second communication node 402, the estimation signal composed of the one or more modulation symbols in which one or more estimation signal sequences are modulated. For example, the first communication node 401 may transmit the estimation signal to be transmitted to the second communication node 402 together with data to be transmitted to the second communication node 402.

The second communication node 402 may receive the estimation signal and/or data transmitted from the first communication node 401 (S440). The second communication node may perform an estimation operation based on the estimation signal received in the step S440 (S450). The estimation in the step S450 may include, for example, estimation of a radio channel, phase noise timing, and the like experienced by the received data. The estimation in the step S450 may include estimation of a position of the first communication node 401, a position of the second communication node 402, or relative positions between the first and second communication nodes 401 and 402.

Figure 5A:
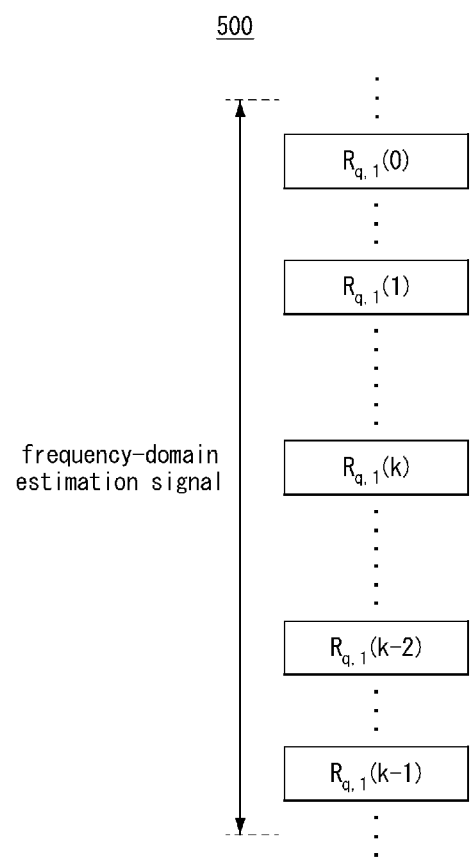
FIGS. 5A and 5B are conceptual diagrams for describing a first exemplary embodiment of a radio signal structure in a communication system.
Figure 5B:
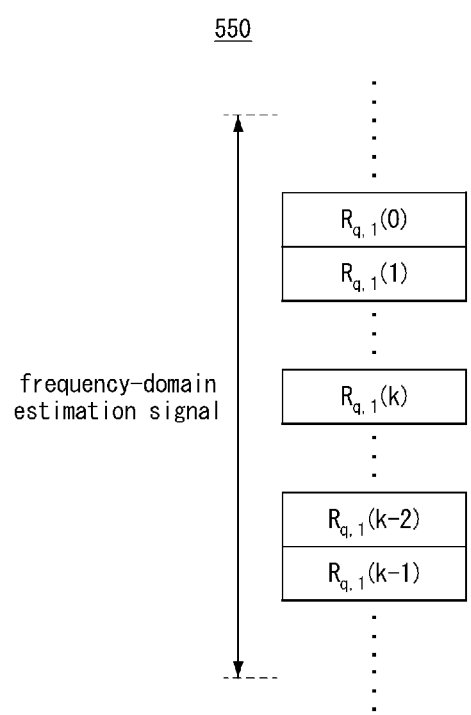

FIGS. 5A and 5B are conceptual diagrams for describing a first exemplary embodiment of a radio signal structure in a communication system.

Referring to FIGS. 5A and 5B, a communication system may include a plurality of communication nodes. The communication system may be the same as or similar to the communication system 400 described with reference to FIG. 4. Hereinafter, in describing the first exemplary embodiment of the radio signal structure in the communication system with reference to FIGS. 5A and 5B, descriptions overlapping those described with reference to FIGS. 1 to 4 may be omitted.

The first communication node may generate and transmit a radio signal to the second communication node. The first communication node may generate one or more radio signals. The first communication node may generate one or more radio signal sequences to generate the one or more radio signals. The first communication node may modulate one or more elements constituting the one or more generated radio signal sequences, and map them to one or more subcarriers in the frequency domain.

In an exemplary embodiment of the communication system, when the number of one or more subcarriers to which the one or more radio signal sequences are mapped is a natural number K greater than or equal to 1, an index k for each of the subcarriers may be a natural number greater than or equal to 0 and less than or equal to K−1. That is, k=0, 1, . . . , K−1. Each of the one or more radio signals may be distinguished based on a discrimination index q. In this case, the first radio signal sequence corresponding to the first radio signal may be expressed as $R_{q,1}(k)$.

In an exemplary embodiment of the communication system, the first radio signal may correspond to the estimation signal described with reference to FIG. 4. The first radio signal may correspond to a cell-specific reference signal (CRS). The first radio signal may correspond to a tracking reference signal (TRS). The first radio signal may correspond to a signaling signal including predetermined signaling information. The first radio signal may correspond to a data signal including data.

The first radio signal sequence $R_{q,1}(k)$ may be generated based on a base sequence $C_q(k)$. Alternatively, the first radio signal sequence $R_{q,1}(k)$ may be generated based on a base sequence $C_q(m)$. Here, m may be a natural number defined based on k. The first radio signal sequence $R_{q,1}(k)$ may be composed of K elements (i.e., $R_{q,1}(0)$, $R_{q,1}(2)$, ..., $R_{q,1}(K-1)$). The first radio signal sequence $R_{q,1}(k)$ may be modulated and mapped to K subcarriers. FIGS. 5A and 5B show a case where K is greater than 1 (i.e., a case where the first radio signal sequence is modulated and mapped to a plurality of subcarriers). However, this is only an example for convenience of description, and the first exemplary embodiment of the radio signal structure in the communication system is not limited thereto.

Referring to FIG. 5A, in a first radio signal structure 500, the first radio signal sequence $R_{q,1}(k)$ may be modulated and mapped to K subcarriers expressed with indexes k (k=0, 1, ..., K-1). The K elements ($R_{q,1}(0)$, $R_{q,1}(2)$, ..., $R_{q,1}(K-1)$ constituting the first radio signal sequence $R_{q,1}(k)$ may be mapped to subcarriers each having a corresponding index, respectively. Here, the K subcarriers to which the first radio signal sequence $R_{q,1}(k)$ is mapped (i.e., K subcarriers to which modulation symbols into which the first radio signal sequence $R_{q,1}(k)$ is modulated are mapped) may be included in a first subcarrier group. The first subcarrier group may include K subcarriers spaced apart from each other in the frequency domain. In other words, the first subcarrier group may be composed of K subcarriers that are not adjacent to each other in the frequency domain.

Referring to FIG. 5B, in a second radio signal structure 550, the first radio signal sequence $R_{q,1}(k)$ may be modulated and mapped to K subcarriers expressed with indexes k (k=0, 1, ..., K-1). Here, K subcarriers to which the first radio signal sequence $R_{q,1}(k)$ is mapped may be included in a second subcarrier group. The second subcarrier group may include K subcarriers, at least some of which are adjacent to each other in the frequency domain. In other words, the second subcarrier group may be composed of K subcarriers, some or all of which are adjacent to each other in the frequency domain.

Figure 6A:
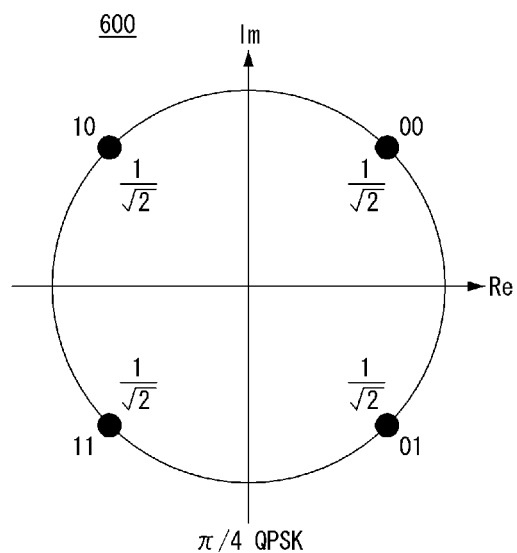
FIGS. 6A and 6B are conceptual diagrams for describing a first exemplary embodiment of a radio signal generation method in a communication system.
Figure 6B:
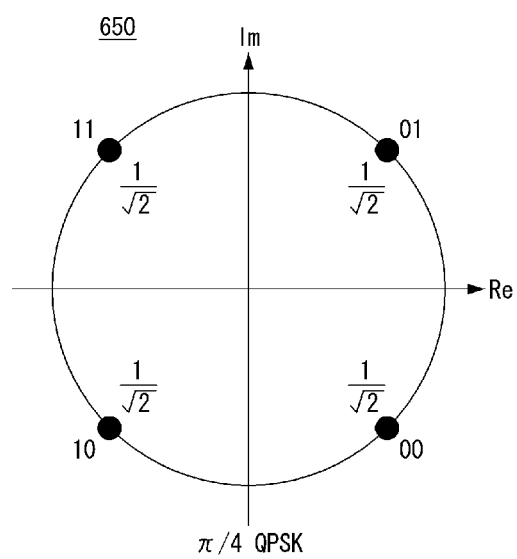

FIGS. 6A and 6B are conceptual diagrams for describing a first exemplary embodiment of a radio signal generation method in a communication system.

Referring to FIGS. 6A and 6B, a communication system may include a plurality of communication nodes. The communication system may be the same as or similar to the communication system 400 described with reference to FIG. 4. In the communication system, a radio signal may have a structure identical to or similar to the first radio signal structure 500 described with reference to FIG. 5A or the second radio signal structure 550 described with reference to FIG. 5B. Hereinafter, in describing the first exemplary embodiment of the radio signal generation method with reference to FIGS. 6A and 6B, overlapping content with those described with reference to FIGS. 1 to 5B may be omitted.

First Exemplary Embodiment of a Radio Signal Generation Method

In an exemplary embodiment of the communication system, the first communication node may generate a radio signal according to the first exemplary embodiment of the radio signal generation method. The first exemplary embodiment of the radio signal generation method may be referred to as a 'Quadrature Phase Shift Keying (QPSK) scheme'. The first exemplary embodiment of the radio signal generation method may be referred to as a 'random complex QPSK scheme'. The first exemplary embodiment of the radio signal generation method may be referred to as a 'π/4 QPSK scheme'.

In the first exemplary embodiment of the radio signal generation method, a first radio signal may be generated based on one or more basic radio signal sequences. The one or more basic radio signal sequences may be generated based on one or more base sequences. In other words, the one or more basic radio signal sequences may correspond to a result obtained by transforming the one or more base sequences according to the first exemplary embodiment of the radio signal generation method. Each of the one or more base sequences may correspond to a binary sequence or a complex sequence. The one or more base sequences may be generated through operations on a plurality of different binary sequences or a plurality of different complex sequences. For example, the one or more base sequences may correspond to a binary pseudo-noise (PN) sequence. A binary PN sequence or a PN sequence may be referred to as a 'm-sequence'.

Each of the one or more base sequences may be configured as a Gold sequence generated through an element-wise exclusive-OR (XOR) operation on two different binary PN sequences.

In an exemplary embodiment of the communication system, a basic radio signal sequence $R_{q,c}(k)$ may be generated based on a base sequence $C_q(k)$ or $C_q(m)$. The basic radio signal sequence may have a discrimination index q for distinguishing a radio signal. The discrimination index q may have a value greater than or equal to 1 and less than $q_{max}$. In an exemplary embodiment of the communication system, the base sequence $C_q(m)$ may be defined identically or similarly to Equation 1 based on a sequence $x_a(\cdot)$.

$$C_q(m)=x_a([m+q]_M), m=0,1,\ldots,M-1 \quad \text{[Equation 1]}$$

In Equation 1, the length M of the sequence $x_a(\cdot)$ may have a value equal to 2K. M may have a value larger than 2K or a value smaller than 2K. $[m+q]_M$ may mean a M-modulo operation on a value of (m+q). The sequence $x_a(\cdot)$ may correspond to a binary sequence. For example, the base sequence $C_q(m)$ may be defined based on one binary PN sequence $x_a(\cdot)$. On the other hand, in another exemplary embodiment of the communication system, the base sequence $C_q(m)$ may be defined identically or similarly to Equation 2 based on the sequence $x_a(\cdot)$ and a sequence $x_b(\cdot)$.

$$C_q(m)=x_a([m+q_a]_M) \oplus x_b([m+q_b]_M), m=0,1,\ldots,M-1 \quad \text{[Equation 2]}$$

In Equation 2, the ⊕ operator may mean an XOR operator. An index $q_a$ and an index $q_b$ may be cyclic shift indexes. The index $q_a$ and index $q_b$ may be indexes corresponding to the sequence $x_a(\cdot)$ and the sequence $x_b(\cdot)$, respectively. In this case, the discrimination index q may be expressed as a function having the index $q_a$ and index $q_b$ as input variables. For example, $q=\text{fuc}(q_a, q_b)$.

In an exemplary embodiment of the communication system, the discrimination index q may be an index for distinguishing variables to be distinguished (or variables to be estimated) such as slot number, physical cell identity (PCI), symbol number, and UE identifier (ID), and may be defined to be mapped one-to-one to the variables to be distinguished. In another exemplary embodiment of the communication system, the discrimination index q may be defined through a combination of the variables to be distinguished (or variables to be estimated) such as slot number, PCI, symbol number, and UE ID. For example, the discrimination index q may be defined as q=fuc($q_c$, $q_d$, ... ) based on $q_c$, $q_d$, etc. corresponding to the variables to be discriminated.

The sequence $x_a(\cdot)$ and sequence $x_b(\cdot)$ may correspond to the same or different binary sequences. For example, the base sequence $C_q(m)$ may be defined based on an XOR operation of two different binary PN sequences. The definition of the base sequence described with reference to Equations 1 and 2 is only an example for convenience of description, and the first exemplary embodiment of the radio signal generation method is not limited thereto.

The basic radio signal sequence $R_{q,c}(k)$ may be defined identically or similarly to Equation 3 based on the base sequence $C_q(m)$.

$$R_{q,c}(k) = \frac{1}{\sqrt{2}}\{(1 - 2C_q(2k)) + j(1 - 2C_q(2k+1))\}, \quad \text{[Equation 3]}$$

$$k = 0, 1, \ldots, K - 1$$

Referring to Equation 3, the basic radio signal sequence $R_{q,c}(k)$ may be defined through an operation on two adjacent elements constituting the base sequence $C_q(m)$. Two adjacent elements constituting the base sequence $C_q(m)$ may be transformed into a real part and an imaginary part of the basic radio signal sequence $R_{q,c}(k)$. For example, an element $C_q(2k)$ (hereinafter, even-numbered element) having an even index among two adjacent elements constituting the base sequence $C_q(m)$ may be transformed into the real part of the basic radio signal sequence $R_{q,c}(k)$. Also, an element $C_q(2k+1)$ (hereinafter, odd-numbered element) having an odd index among two adjacent elements constituting the base sequence $C_q(m)$ may be transformed into the imaginary part of the basic radio signal sequence $R_{q,c}(k)$.

In Equation 3, the base sequence $C_q(m)$ may be a binary sequence. An even-numbered element $C_q(2k)$ and an odd-numbered element $C_q(2k+1)$ constituting the base sequence $C_q(m)$ may each have a value of 0 or 1. The even-numbered element $C_q(2k)$ constituting the base sequence $C_q(m)$ may be multiplied by 1/V after a Binary Phase Shift Keying (BPSK) operation, and transformed into the real part of the basic radio signal sequence $R_{q,c}(k)$. The odd-numbered element $C_q(2k+1)$ constituting the base sequence $C_q(m)$ may be multiplied by $1/\sqrt{2}$ or $j/\sqrt{2}$ after a BPSK operation, and transformed into the imaginary part of the basic radio signal sequence $R_{q,c}(k)$. The basic radio signal sequence $R_{q,c}(k)$ generated in this manner may correspond to a complex sequence. For example, according to the values of the element $C_q(2k)$ and element $C_q(2k+1)$, the basic radio signal sequence $R_{q,c}(k)$ may have a value $$\frac{1}{\sqrt{2}} + \frac{j}{\sqrt{2}}, \frac{1}{\sqrt{2}} - \frac{j}{\sqrt{2}}, -\frac{1}{\sqrt{2}} + \frac{j}{\sqrt{2}}, -\frac{1}{\sqrt{2}} - \frac{j}{\sqrt{2}},$$

or the like.

FIG. 6A shows an exemplary embodiment 600 (hereinafter, first basic constellation map) of a constellation map for the basic radio signal sequence $R_{q,c}(k)$ or the first radio signal generated based on Equation 3 in the first exemplary embodiment of the radio signal generation method. The first radio signal may be represented by four constellation points on the first basic constellation map 600. All of the four constellation points corresponding to the first radio signal may have complex coordinates each having a real part and an imaginary part on a complex plane.

In the first basic constellation map 600, a constellation point '00' may correspond to a case where $C_q(2k)=0$ and $C_q(2k+1)=0$, a constellation point '01' may correspond to a case where $C_q(2k)=0$ and $C_q(2k+1)=1$, a constellation point '10' may correspond to a case where $C_q(2k)=1$ and $C_q(2k+1)=0$, and a constellation point '11' may correspond to a case where $C_q(2k)=1$ and $C_q(2k+1)=1$. In the first basic constellation map 600, a value of the basic radio signal sequence $R_{q,c}(k)$ corresponding to the constellation point '00' may be $$\frac{1}{\sqrt{2}} + \frac{j}{\sqrt{2}},$$

a value of the basic radio signal sequence $R_{q,c}(k)$ corresponding to the constellation point '01' may be $$\frac{1}{\sqrt{2}} - \frac{j}{\sqrt{2}},$$

a value of the basic radio signal sequence $R_{q,c}(k)$ corresponding to the constellation point '10' may be $$-\frac{1}{\sqrt{2}} + \frac{j}{\sqrt{2}},$$

and a value of the basic radio signal sequence $R_{q,c}(k)$ corresponding to constellation point '11' may be $$-\frac{1}{\sqrt{2}} - \frac{j}{\sqrt{2}}.$$

In another exemplary embodiment of the communication system, the basic radio signal sequence $R_{q,c}(k)$ may be defined identically or similarly to Equation 4 based on the base sequence $C_q(m)$.

$$R_{q,c}(k) = \frac{1}{\sqrt{2}}\{(1 - 2C_q(2k)) - j(1 - 2C_q(2k+1))\}, \quad \text{[Equation 4]}$$

$$k = 0, 1, \ldots, K - 1$$

Referring to Equation 4, an even-numbered element $C_q(2k)$ constituting the base sequence $C_q(m)$ may be multiplied by $1/\sqrt{2}$ after a BPSK operation, and transformed into the real part of the basic radio signal sequence $R_{q,c}(k)$. An odd-numbered element $C_q(2k+1)$ constituting the base sequence $C_q(m)$ may be multiplied by $-1/\sqrt{2}$ or $-j/\sqrt{2}$ after a BPSK operation, and transformed into the imaginary part of the basic radio signal sequence $R_{q,c}(k)$.

FIG. 6B shows an exemplary embodiment 650 (hereinafter, second basic constellation map) of a constellation map for the basic radio signal sequence $R_{q,c}(k)$ or the first radio signal generated based on Equation 4 in the first exemplary embodiment of the radio signal generation method. In the second basic constellation map 650, a value of the basic radio signal sequence $R_{q,c}(k)$ corresponding to a constellation point '0' may be $$\frac{1}{\sqrt{2}} - \frac{j}{\sqrt{2}},$$

a value of the basic radio signal sequence $R_{q,c}(k)$ corresponding to a constellation point '01' may be $$\frac{1}{\sqrt{2}} + \frac{j}{\sqrt{2}},$$

a value of the basic radio signal sequence $R_{q,c}(k)$ corresponding to a constellation point '10' may be $$-\frac{1}{\sqrt{2}} - \frac{j}{\sqrt{2}},$$

and a value of the basic radio signal sequence $R_{q,c}(k)$ corresponding to a constellation point '11' may be $$-\frac{1}{\sqrt{2}} + \frac{j}{\sqrt{2}}.$$

In the first exemplary embodiment of the radio signal generation method, the length of each of one or more base sequences (e.g., the number of elements each of the binary PN sequences) may correspond to '$2^{31}-1$'. The length of each of the one or more base sequences may correspond to a significantly larger value than the total number of elements of the first radio signal generated according to the first exemplary embodiment of the radio signal generation method. For example, when the first radio signal corresponds to an estimation signal transmitted in downlink (DL) from the base station to the terminal (or UE), the total number of elements of the first radio signal may be significantly smaller than the length of each of the one or more base sequences. Specifically, assuming that the first radio signal is a CRS allocated to the base station, an element group of the first radio signal may consist of 220 elements. Assuming that the first radio signal is a TRS allocated to the base station, an element group of the first radio signal may consist of 396 elements. This may correspond to a size about 107 times smaller than the length of the base sequence (e.g., $2^{31}-1$). This may be a technical feature for preventing element groups of various types of estimation signals, such as slot number, PCI, symbol number, and UE ID, from overlapping with each other as much as possible. In the first exemplary embodiment of the radio signal generation method, correlation characteristics between different element groups may not be excellent. Due to this, performance of timing estimation, radio channel estimation, phase noise estimation, and the like using the estimation signal may be deteriorated in some cases.

The first communication node may transmit the first radio signal generated based on the basic radio signal sequence $R_{q,c}(k)$ represented by Equation 3 or Equation 4 to the second communication node. The second communication node may receive the first radio signal. When the first radio signal corresponds to the estimation signal, the second communication node may perform timing estimation, radio channel estimation, phase noise estimation, and the like based on the first radio signal. Meanwhile, when the first radio signal corresponds to a signaling signal or a data signal, the second communication node may obtain signaling information or data by restoring the first radio signal. In such the estimation operation or restoration operation, the second communication node may need to perform complex multiplication operations for the respective resource elements from which a plurality of elements constituting the first radio signal are received. In the estimation operation or restoration operation involving such the complex multiplication operations, a required amount of operations (or the amount of operation resources) may be large and the complexity of the operations may be high.

FIGS. 7A to 7H are conceptual diagrams for describing a second exemplary embodiment of a radio signal generation method in a communication system.

Referring to FIGS. 7A to 7H, the communication system may include a plurality of communication nodes. The communication system may be the same as or similar to the communication system 400 described with reference to FIG. 4. In the communication system, a radio signal may have a structure identical to or similar to the first radio signal structure 500 described with reference to FIG. 5A or the second radio signal structure 550 described with reference to FIG. 5B. Hereinafter, in describing the second exemplary embodiment of the radio signal generation method with reference to FIGS. 7A to 7B, overlapping content with those described with reference to FIGS. 1 to 6B may be omitted.

Second Exemplary Embodiment of a Radio Signal Generation Method

In an exemplary embodiment of the communication system, the first communication node may generate a radio signal according to the second exemplary embodiment of the radio signal generation method. In the second exemplary embodiment of the radio signal generation method, a first radio signal may be generated based on one or more first radio signal sequences. The one or more first radio signal sequences may be the same as or similar to the first radio signal sequences described with reference to FIGS. 5A and 5B. The one or more first radio signal sequences may be generated based on one or more base sequences. In other words, the one or more first radio signal sequences may correspond to a result obtained by transforming the one or more base sequences according to the second exemplary embodiment of the radio signal generation method. FIGS. 7A to 7H show exemplary embodiments of a constellation map for the first radio signal generated based on the second exemplary embodiment of the radio signal generation method.

Figure 7A:
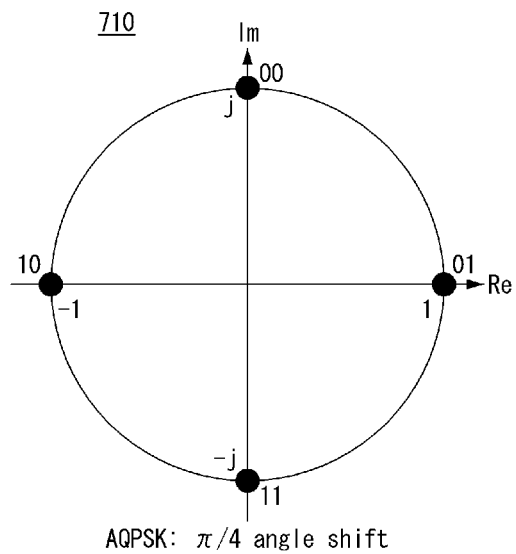
FIGS. 7A to 7H are conceptual diagrams for describing a second exemplary embodiment of a radio signal generation method in a communication system.

FIG. 7A shows a first exemplary embodiment 710 (hereinafter referred to as 'first constellation map') of a constellation map for a first radio signal sequence $R_{q,1}(k)$ or the first radio signal. The first radio signal may be represented by four constellation points in the first constellation map 710. All of the four constellation points corresponding to the first radio signal in the first constellation map 710 may have coordinates having only real parts or only imaginary parts on the complex plane. In other words, all of the four constellation points corresponding to the first radio signal in the first constellation map 710 may be located on the real axis or the imaginary axis on the complex plane.

The four constellation points corresponding to the first radio signal in the first constellation map 710 may correspond to values of the first radio signal sequence $R_{q,1}(k)$. For example, the first radio signal sequence $R_{q,1}(k)$ may be defined identically or similarly to Equation 5 based on the base sequence $C_q(m)$.

$$R_{q,1}(k) = \frac{e^{j\frac{\pi}{4}}}{\sqrt{2}}\{(1 - 2C_q(2k)) + j(1 - 2C_q(2k + 1))\},$$ [Equation 5]

$$k = 0, 1, \ldots, K - 1$$

Referring to Equation 5, the first radio signal sequence $R_{q,1}(k)$ may be defined through an operation on two adjacent elements constituting the base sequence $C_q(m)$. Two adjacent elements constituting the base sequence $C_q(m)$ may be transformed into a real part and an imaginary part of the first radio signal sequence $R_{q,1}(k)$. For example, an element $C_q(2k)$ having an even index (hereinafter, even-numbered element) among the two adjacent elements constituting the base sequence $C_q(m)$ may be transformed into a real part of the first radio signal sequence $R_{q,1}(k)$. An element $C_q(2k+1)$ having an odd index (hereinafter, odd-numbered element) among the two adjacent elements constituting the base sequence $C_q(m)$ may be transformed into an imaginary part of the first radio signal sequence $R_{q,1}(k)$.

In Equation 5, the even-numbered element $C_q(2k)$ constituting the base sequence $C_q(m)$ may be multiplied by $$e^{j\frac{\pi}{4}}/\sqrt{2}$$

after a BPSK operation. The odd-numbered element $C_q(2k+1)$ constituting the base sequence $C_q(m)$ may be multiplied by $$je^{j\frac{\pi}{4}}/\sqrt{2}$$

after a BPSK operation. According to the values of the element $C_q(2k)$ and element $C_q(2k+1)$, the first radio signal sequence $R_{q,1}(k)$ may have a value such as j, 1, −1, −j.

The first radio signal sequence $R_{q,1}(k)$ defined as in Equation 5 may correspond to a result obtained by performing a rotational transform operation having a size of π/4 on the basic radio signal sequence $R_{q,c}(k)$ defined as in Equation 3. In other words, the four constellation points in the first constellation map 710 shown in FIG. 7A may correspond to a result obtained by shifting (or rotating) the four constellation points in the first basic constellation map 600 shown in FIG. 6A at a rotation angle π/4 on the complex plane.

In the first constellation map 710, a constellation point '00' may correspond to a case where $C_q(2k)=0$ and $C_q(2k+1)=0$, a constellation point '01' may correspond to a case where $C_q(2k)=0$ and $C_q(2k+1)=1$, a constellation point '10' may correspond to a case where $C_q(2k)=1$ and $C_q(2k+1)=0$, and a constellation point '11' may correspond to a case where $C_q(2k)=1$ and $C_q(2k+1)=1$. In the first constellation map 710, a value of the first radio signal sequence $R_{q,1}(k)$ corresponding to the constellation point '00' may be an imaginary number j, a value of the first radio signal sequence $R_{q,1}(k)$ corresponding to the constellation point '01' may be a real number 1, a value of the first radio signal sequence $R_{q,1}(k)$ corresponding to the constellation point '10' may be a real number −1, and a value of the first radio signal sequence $R_{q,1}(k)$ corresponding to the constellation point '11' may be an imaginary number −j.

Figure 7B:
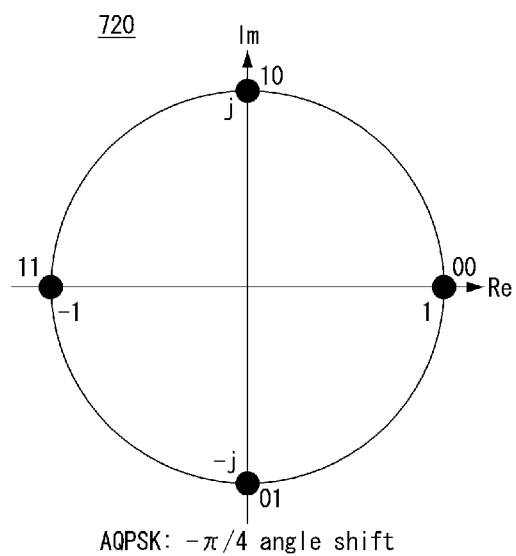

FIG. 7B shows a second exemplary embodiment 720 (hereinafter referred to as 'second constellation map') of a constellation map for the first radio signal sequence $R_{q,1}(k)$ or the first radio signal. Four constellation points corresponding to the first radio signal in the second constellation map 720 may correspond to values of the first radio signal sequence $R_{q,1}(k)$. For example, the first radio signal sequence $R_{q,1}(k)$ may be defined identically or similarly to Equation 6 based on the base sequence $C_q(m)$.

$$R_{q,1}(k) = \frac{e^{-j\frac{\pi}{4}}}{\sqrt{2}}\{(1 - 2C_q(2k)) + j(1 - 2C_q(2k + 1))\},$$ [Equation 6]

$$k = 0, 1, \ldots, K - 1$$

Referring to Equation 6, the first radio signal sequence $R_{q,1}(k)$ may be defined through an operation on two adjacent elements constituting the base sequence $C_q(m)$. Two adjacent elements constituting the base sequence $C_q(m)$ may be transformed into a real part and an imaginary part. For example, an element $C_q(2k)$ having an even index (hereinafter, even-numbered element) among the two adjacent elements constituting the base sequence $C_q(m)$ may be transformed into a real part, and an element $C_q(2k+1)$ having an odd index (hereinafter, odd-numbered element) among the two adjacent elements constituting the base sequence $C_q(m)$ may be transformed into an imaginary part.

In Equation 6, the even-numbered element $C_q(2k)$ constituting the base sequence $C_q(m)$ may be multiplied by $$e^{-j\frac{\pi}{4}}/\sqrt{2}$$

after a BPSK operation. The odd-numbered element $C_q(2k+1)$ constituting the base sequence $C_q(m)$ may be multiplied by $$je^{-j\frac{\pi}{4}}/\sqrt{2}$$

after a BPSK operation. The first radio signal sequence $R_{q,1}(k)$ defined as in Equation 6 may correspond to a result obtained by performing a rotational transform operation having a size of −π/4 on the basic radio signal sequence $R_{q,c}(k)$ defined as in Equation 3. In other words, the four constellation points in the second constellation map 720 shown in FIG. 7B may correspond to a result obtained by shifting (or rotating) the four constellation points in the first basic constellation map 600 shown in FIG. 6A at a rotation angle −π/4 on the complex plane. In the second constellation map 720, a value of the first radio signal sequence $R_{q,1}(k)$ corresponding to a constellation point '00' may be a real number 1, a value of the first radio signal sequence $R_{q,1}(k)$ corresponding to the constellation point '01' may be an imaginary number −j, a value of the first radio signal sequence $R_{q,1}(k)$ corresponding to the constellation point '10' may be an imaginary number j, and a value of the first radio signal sequence $R_{q,1}(k)$ corresponding to the constellation point '11' may be a real number −1.

In the second exemplary embodiment of the radio signal generation method, the first radio signal sequence $R_{q,1}(k)$ may be generated based on Equation 5 or Equation 6 or the like. Values of the first radio signal sequence $R_{q,1}(k)$ may correspond to the four constellation points in the first constellation map 710 shown in FIG. 7A or the second constellation map 720 shown in FIG. 7B. However, this is only an example for convenience of description, and the second exemplary embodiment of the radio signal generation method is not limited thereto.

Figure 7C:
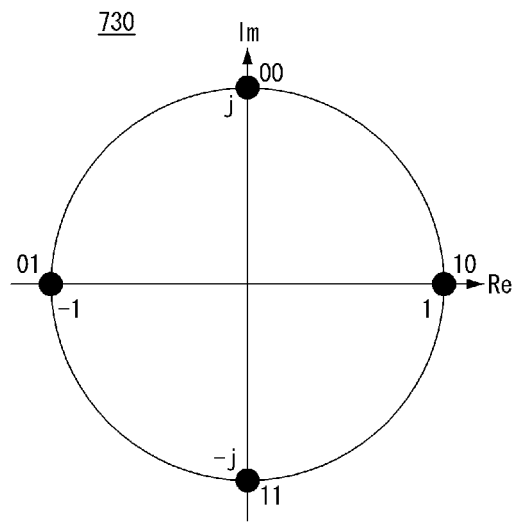

For example, FIG. 7C shows a third exemplary embodiment 730 (hereinafter, third constellation map) of a constellation map for the first radio signal sequence $R_{q,1}(k)$ or the first radio signal. In the third constellation map 730, a value of the first radio signal sequence $R_{q,1}(k)$ corresponding to a constellation point '00' may be an imaginary number j, a value of the first radio signal sequence $R_{q,1}(k)$ corresponding to the constellation point '01' may be a real number −1, a value of the first radio signal sequence $R_{q,1}(k)$ corresponding to the constellation point '10' may be a real number 1, and a value of the first radio signal sequence $R_{q,1}(k)$ corresponding to the constellation point '11' may be an imaginary number −j.

The first radio signal sequence $R_{q,1}(k)$, which is represented with the four constellation points in the third constellation map 730 shown in FIG. 7C, may correspond to a result obtained by performing a rotational transform operation having a size of $3\pi/4$ on the basic radio signal sequence $R_{q,c}(k)$ defined as in Equation 4 on the complex plane. In other words, the four constellation points in the third constellation map 730 may correspond to a result obtained by shifting (or rotating) the four constellation points on the second basic constellation map 650 shown in FIG. 6B at a rotation angle $3\pi/4$ on the complex plane.

Figure 7D:
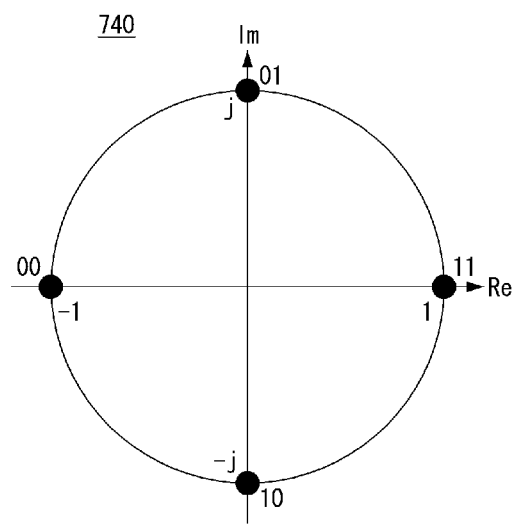

For example, FIG. 7D shows a fourth exemplary embodiment 740 (hereinafter, fourth constellation map) of a constellation map for the first radio signal sequence $R_{q,1}(k)$ or the first radio signal. In the fourth constellation map 740, a value of the first radio signal sequence $R_{q,1}(k)$ corresponding to the constellation point '00' may be a real number 1, a value of the first radio signal sequence $R_{q,1}(k)$ corresponding to the constellation point '01' may be an imaginary number j, a value of the first radio signal sequence $R_{q,1}(k)$ corresponding to the constellation point '10' may be an imaginary number −j, and a value of the first radio signal sequence $R_{q,1}(k)$ corresponding to the constellation point '11' may be a real number −1.

The first radio signal sequence $R_{q,1}(k)$, which is represented with the four constellation points in the fourth constellation map 740 shown in FIG. 7D, may correspond to a result obtained by performing a rotational transform operation having a size of $3\pi/4$ on the basic radio signal sequence $R_{q,c}(k)$ defined as in Equation 3. In other words, the four constellation points in the fourth constellation map 740 may correspond to a result obtained by shifting (or rotating) the four constellation points on the first basic constellation map 600 shown in FIG. 6A at a rotation angle $3\pi/4$ on the complex plane.

Figure 7E:
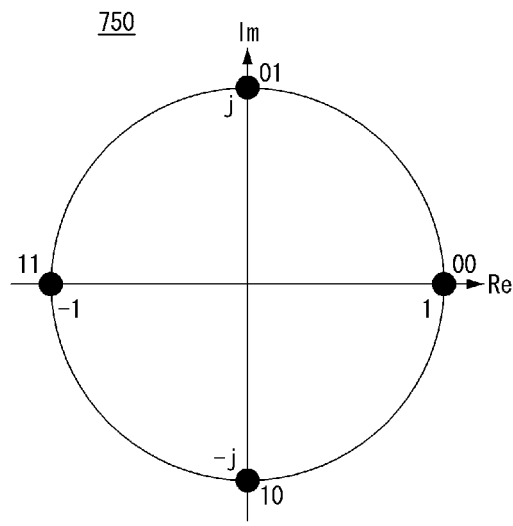

For example, FIG. 7E shows a fifth exemplary embodiment 750 (hereinafter, fifth constellation map) of a constellation map for the first radio signal sequence $R_{q,1}(k)$ or the first radio signal. In the fifth constellation map 750, a value of the first radio signal sequence $R_{q,1}(k)$ corresponding to the constellation point '00' may be a real number 1, a value of the first radio signal sequence $R_{q,1}(k)$ corresponding to the constellation point '01' may be an imaginary number j, a value of the first radio signal sequence $R_{q,1}(k)$ corresponding to the constellation point '10' may be an imaginary number −j, and a value of the first radio signal sequence $R_{q,1}(k)$ corresponding to the constellation point '11' may be a real number −1.

The first radio signal sequence $R_{q,1}(k)$, which is represented with the four constellation points in the fifth constellation map 750 shown in FIG. 7E, may correspond to a result obtained by performing a rotational transform operation having a size of $-\pi/4$ on the basic radio signal sequence $R_{q,c}(k)$ defined as in Equation 4. In other words, the four constellation points in the fifth constellation map 750 may correspond to a result obtained by shifting (or rotating) the four constellation points on the second basic constellation map 650 shown in FIG. 6B at a rotation angle $-\pi/4$ on the complex plane.

Figure 7F:
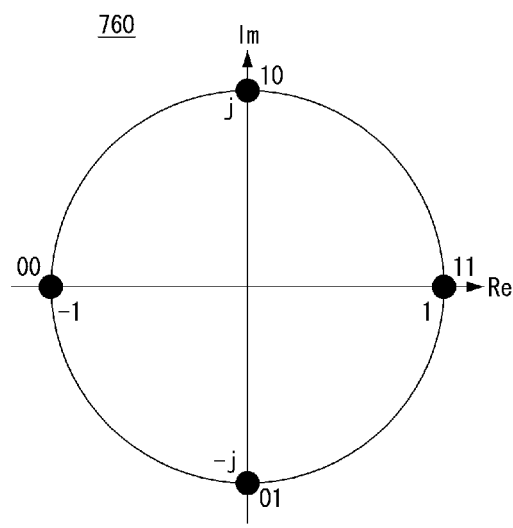

For example, FIG. 7F shows a sixth exemplary embodiment 760 (hereinafter, sixth constellation map) of a constellation map for the first radio signal sequence $R_{q,1}(k)$ or the first radio signal. In the sixth constellation map 760, a value of the first radio signal sequence $R_{q,1}(k)$ corresponding to the constellation point '00' may be a real number −1, a value of the first radio signal sequence $R_{q,1}(k)$ corresponding to the constellation point '01' may be an imaginary number −j, a value of the first radio signal sequence $R_{q,1}(k)$ corresponding to the constellation point '10' may be an imaginary number j, and a value of the first radio signal sequence $R_{q,1}(k)$ corresponding to the constellation point '11' may be a real number 1.

The first radio signal sequence $R_{q,1}(k)$, which is represented with the four constellation points in the sixth constellation map 760 shown in FIG. 7F, may correspond to a result obtained by performing a rotational transform operation having a size of $-3\pi/4$ on the basic radio signal sequence $R_{q,c}(k)$ defined as in Equation 4. In other words, the four constellation points in the sixth constellation map 760 may correspond to a result obtained by shifting (or rotating) the four constellation points on the second basic constellation map 650 shown in FIG. 6B at a rotation angle $-3\pi/4$ on the complex plane.

Figure 7G:
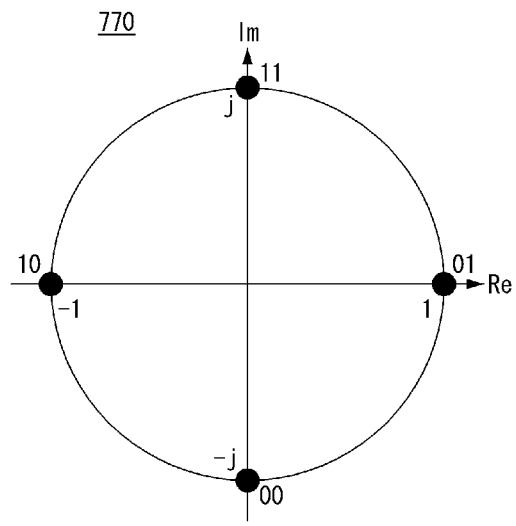

For example, FIG. 7G shows a seventh exemplary embodiment 770 (hereinafter, seventh constellation map) of a constellation map for the first radio signal sequence $R_{q,1}(k)$ or the first radio signal. In the seventh constellation map 770, a value of the first radio signal sequence $R_{q,1}(k)$ corresponding to the constellation point '00' may be an imaginary number −j, a value of the first radio signal sequence $R_{q,1}(k)$ corresponding to the constellation point '01' may be a real number 1, a value of the first radio signal sequence $R_{q,1}(k)$ corresponding to the constellation point '10' may be a real number −1, and a value of the first radio signal sequence $R_{q,1}(k)$ corresponding to the constellation point '11' may be an imaginary number j.

The first radio signal sequence $R_{q,1}(k)$, which is represented with the four constellation points in the seventh constellation map 770 shown in FIG. 7G, may correspond to a result obtained by performing a rotational transform operation having a size of $-\pi/4$ on the basic radio signal sequence $R_{q,c}(k)$ defined as in Equation 4. In other words, the four constellation points in the seventh constellation map 770 may correspond to a result obtained by shifting (or rotating) the four constellation points on the second basic constellation map 650 shown in FIG. 6B at a rotation angle $-\pi/4$ on the complex plane.

Figure 7H:
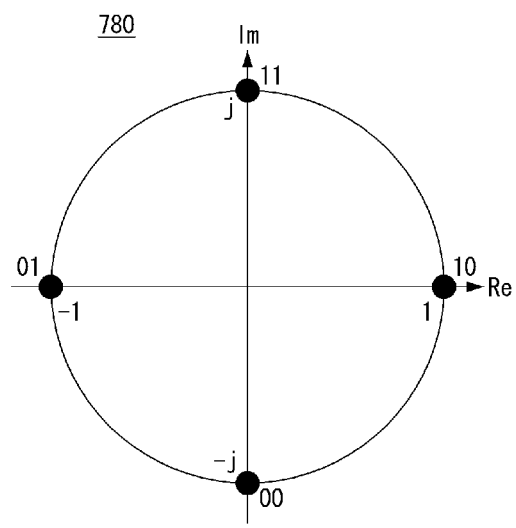

For example, FIG. 7H shows an eighth exemplary embodiment 780 (hereinafter, eighth constellation map) of a constellation map for the first radio signal sequence $R_{q,1}(k)$ or the first radio signal. In the eighth constellation map 780, a value of the first radio signal sequence $R_{q,1}(k)$ corresponding to the constellation point '00' may be an imaginary number −j, a value of the first radio signal sequence $R_{q,1}(k)$ corresponding to the constellation point '01' may be a real number −1, a value of the first radio signal sequence $R_{q,1}(k)$ corresponding to the constellation point '10' may be a real number 1, and a value of the first radio signal sequence $R_{q,1}(k)$ corresponding to the constellation point '11' may be an imaginary number j.

The first radio signal sequence $R_{q,1}(k)$, which is represented with the four constellation points in the eighth constellation map 780 shown in FIG. 7H, may correspond to a result obtained by performing a rotational transform operation having a size of $-3\pi/4$ on the basic radio signal sequence $R_{q,c}(k)$ defined as in Equation 3. In other words, the four constellation points in the eighth constellation map 780 may correspond to a result obtained by shifting (or rotating) the four constellation points on the first basic constellation map 600 shown in FIG. 6A at a rotation angle $-3\pi/4$ on the complex plane.

In the first to eighth constellation maps 710, . . . , and 780 described with reference to FIGS. 7A to 7H, the four constellation points corresponding to the first radio signal generated according to the second exemplary embodiment of the radio signal generation method may all be located on the real axis or on the imaginary axis on the complex plane. The second exemplary embodiment of the radio signal generation method may be referred to as 'Axis QPSK (AQPSK) scheme' or 'AQPSK generation scheme'.

The first communication node may generate the first radio signal based on the basic radio signal sequence $R_{q,c}(k)$ generated according to the second exemplary embodiment of the radio signal generation method. The first communication node may transmit the first radio signal generated based on the second exemplary embodiment of the radio signal generation method to the second communication node. The second communication node may receive the first radio signal. The second communication node may perform an estimation operation or a restoration operation based on the first radio signal. Here, the first radio signal sequence $R_{q,1}(k)$ generated according to the second exemplary embodiment of the radio signal generation method may have a real value (1, −1, etc.) or a pure imaginary value (j, −j, etc.). Accordingly, when the second communication node performs the estimation operation or restoration operation based on the first radio signal generated according to the second exemplary embodiment of the radio signal generation method, complex multiplication operations may not be required. Compared to the estimation operation or restoration operation based on the first radio signal generated according to the first exemplary embodiment of the radio signal generation method described with reference to FIG. 6, the required computational complexity or amount (or amount of computational resources) may be lower. That is, the performance of an estimation operation or restoration operation performed by a communication node receiving a radio signal generated according to the second exemplary embodiment of the radio signal generation method can be improved.

The second exemplary embodiment of the radio signal generation method was described with reference to FIGS. 4 to 7H by taking a case in which the first radio signal sequence $R_{q,1}(k)$ is generated based on operations in the AQPSK scheme (hereinafter referred to as 'AQPSK operation') for the predetermined base sequence $C_q(m)$ as an example. However, this is only an example for convenience of description, and the second exemplary embodiment of the radio signal generation method is not limited thereto.

For example, in the second exemplary embodiment of the radio signal generation method, the first communication node may desire to transmit data or information (hereinafter referred to as 'first information') to the second communication node. In this case, the first communication node may generate the first radio signal sequence $R_{q,1}(k)$ by performing an AQPSK operation on a sequence generated based on the first information. The first communication node may generate the first radio signal based on the first information by modulating the first radio signal sequence $R_{q,1}(k)$.

In the second exemplary embodiment of the radio signal generation method, the first communication node may generate one or more sequences based on information to be transmitted to the second communication node. The one or more sequences generated based on the information to be transmitted from the first communication node to the second communication node may be expressed as $D_q(m)$. $D_q(m)$ may be a binary sequence. The first communication node may generate one or more binary sequences $D_q(m)$ by transforming the information to be transmitted to the second communication node. The first communication node may generate one or more first radio signal sequences $R_{q,1}(k)$ by performing an AQPSK operation on the generated one or more binary sequences $D_q(m)$. The first communication node may generate modulation symbols by modulating the generated one or more first radio signal sequences $R_{q,1}(k)$. The first communication node may map the modulation symbols to radio resources. Through this, the first communication node may generate the first radio signal composed of the modulation symbols mapped to the radio resources. The first communication node may transmit the first radio signal to the second communication node. The second communication node may obtain the information that the first communication node intends to transmit by performing a restoration operation on the radio signal transmitted from the first communication node.

Figure 8A:
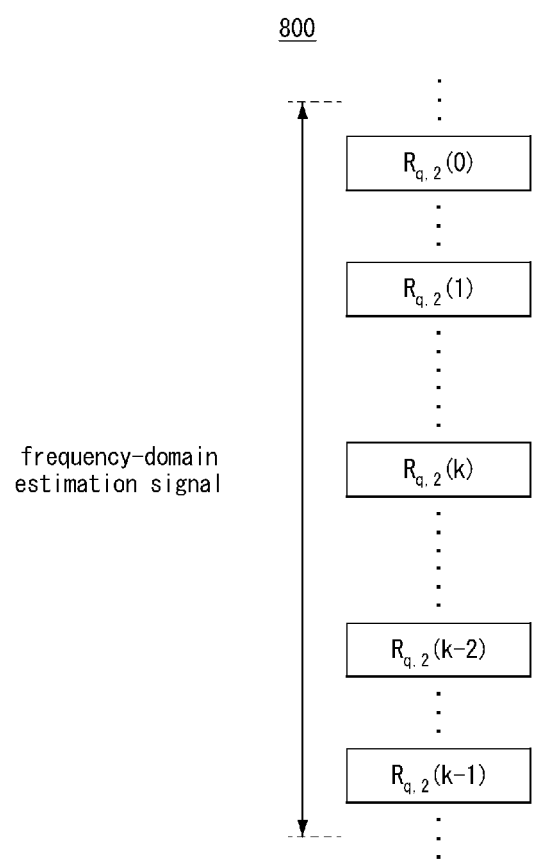
FIGS. 8A and 8B are conceptual diagrams for describing a second exemplary embodiment of a radio signal structure in a communication system.
Figure 8B:
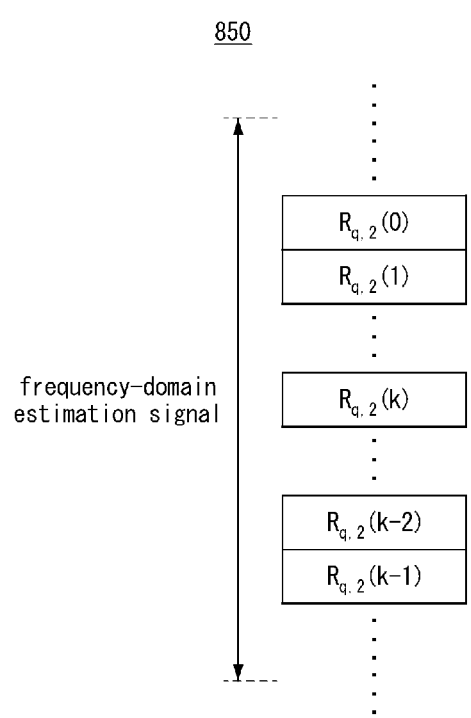

FIGS. 8A and 8B are conceptual diagrams for describing a second exemplary embodiment of a radio signal structure in a communication system.

Referring to FIGS. 8A and 8B, a communication system may include a plurality of communication nodes. The communication system may be the same as or similar to the communication system 400 described with reference to FIG. 4. Hereinafter, in describing the second exemplary embodiment of the radio signal structure in the communication system with reference to FIGS. 8A and 8B, descriptions overlapping those described with reference to FIGS. 1 to 7H may be omitted.

The first communication node may generate and transmit a radio signal to the second communication node. The first communication node may generate one or more radio signals. The first communication node may generate one or more radio signal sequences to generate the one or more radio signals. The first communication node may modulate one or more elements constituting the one or more generated radio signal sequences, and map them to one or more subcarriers in the frequency domain.

In an exemplary embodiment of the communication system, when the number of one or more subcarriers to which the one or more radio signal sequences are mapped is a natural number K greater than or equal to 1, an index k of the subcarriers may be a natural number greater than or equal to 0 and less than or equal to K−1. Each of the one or more radio signals may be distinguished based on a discrimination index q. In this case, a second radio signal sequence corresponding to a second radio signal may be expressed as $R_{q,2}(k)$.

In an exemplary embodiment of the communication system, the second radio signal may correspond to the estimation signal described with reference to FIG. 4. The second radio signal may correspond to a signaling signal including predetermined signaling information. The second radio signal may correspond to a data signal including data.

Referring to FIG. 8A, in a third radio signal structure 800, the second radio signal sequence $R_{q,2}(k)$ may be modulated and mapped to K subcarriers expressed with an index k (k=0, 1, . . . , K−1). The K elements ($R_{q,2}(0)$, $R_{q,2}(2)$, . . . , $R_{q,2}(K-1)$ constituting the second radio signal sequence $R_{q,2}(k)$ may be mapped to subcarriers each having a corresponding index, respectively. Here, the K subcarriers to which the second radio signal sequence $R_{q,2}(k)$ is mapped may be included in a third subcarrier group. The third subcarrier group may include K subcarriers spaced apart from each other in the frequency domain.

Referring to FIG. 8B, in a fourth radio signal structure 850, the second radio signal sequence $R_{q,2}(k)$ may be modulated and mapped to K subcarriers expressed with an index k (k=0, 1, . . . , K−1). Here, K subcarriers to which the second radio signal sequence $R_{q,2}(k)$ is mapped may be included in a fourth subcarrier group. The fourth subcarrier group may include K subcarriers, at least some of which are adjacent to each other in the frequency domain.

Third Exemplary Embodiment of a Radio Signal Generation Method

In an exemplary embodiment of the communication system, the first communication node may generate a radio signal according to the third exemplary embodiment of the radio signal generation method. In the third exemplary embodiment of the radio signal generation method, the second radio signal sequence $R_{q,2}(k)$ may be defined based on a first intermediate sequence $R_{q1,1}(k)$ and a second intermediate sequence $R_{q2,2}(k)$ generated based on the second exemplary embodiment of the radio signal generation method described with reference to FIGS. 7A to 7H.

Specifically, the second radio signal sequence $R_{q,2}(k)$ may be defined as a function sequence for the first intermediate sequence $R_{q1,1}(k)$ and the second intermediate sequence $R_{q2,2}(k)$ generated identically or similarly to the first radio signal sequence $R_{q,1}(k)$ described with reference to FIGS. 7A to 7H. The first intermediate sequence $R_{q1,1}(k)$ may be generated based on a first base sequence $C_{q1,1}(m)$. The first intermediate sequence $R_{q1,1}(k)$ may be generated by performing an AQPSK-scheme operation on the first base sequence $C_{q1,1}(m)$. The second intermediate sequence $R_{q2,2}(k)$ may be generated based on a second base sequence $C_{q2,2}(m)$. The second intermediate sequence $R_{q2,2}(k)$ may be generated by performing an AQPSK-scheme operation on the second base sequence $C_{q2,2}(m)$. Here, the AQPSK-scheme operation may correspond to one of the operations described with reference to FIGS. 7A to 7H. For example, the second radio signal sequence $R_{q,2}(k)$, the first intermediate sequence $R_{q1,1}(k)$, and the second intermediate sequence $R_{q2,2}(k)$ may be defined identically or similarly to Equation 7.

$$R_{q,2}(k) = f_1(R_{q_1,1}(k), R_{q_2,2}(k)), \ k = 0,1, \ldots, K-1 \quad \text{[Equation 7]}$$

$$R_{q_1,1}(k) = \frac{e^{\pm j\frac{\pi}{4}}}{\sqrt{2}}\{(1 - 2C_{q_1,1}(2k)) + j(1 - 2C_{q_1,1}(2k+1))\}$$

-continued $$R_{q_2,2}(k) = \frac{e^{\pm j\frac{\pi}{4}}}{\sqrt{2}}\{(1 - 2C_{q_2,2}(2k)) + j(1 - 2C_{q_2,2}(2k+1))\}$$

$$q = f_2(q_1, q_2)$$

Referring to Equation 7, the second radio signal sequence $R_{q,2}(k)$ may be defined based on a first function $f_1(a, b)$. The second radio signal sequence $R_{q,2}(k)$ may be defined as an operation result obtained by inputting the first intermediate sequence $R_{q1,1}(k)$ and the second intermediate sequence $R_{q2,2}(k)$ to the first function $f_1(a, b)$. Here, the first function $f_1(a, b)$ may be defined as a predetermined operation for a variable a and a variable b. For exempla, the first function $f_1(a, b)$ may be defined as a multiplication function for the variables a and b. However, this is only an example for convenience of description, and the third exemplary embodiment of the radio signal generation method is not limited thereto.

A first intermediate index $q_1$ and a second intermediate index $q_2$ may mean specific or unique variables that may be mapped to the discrimination index q. The first intermediate index $q_1$ may correspond to a discrimination index for distinguishing the first intermediate sequence $R_{q1,1}(k)$. The second intermediate index $q_2$ may correspond to a discrimination index for distinguishing the second intermediate sequence $R_{q2,2}(k)$. That is, the discrimination index q for distinguishing the second radio signal sequence $R_{q,2}(k)$ may be defined based on the discrimination index for distinguishing the first intermediate sequence $R_{q1,1}(k)$ and the discrimination index for distinguishing the second intermediate sequence $R_{q2,2}(k)$.

Specifically, the discrimination index q may be defined based on a second function $f_2(a, b)$. The discrimination index q may be defined as an operation result obtained by inputting the first intermediate index $q_1$ and the second intermediate index $q_2$ to the second function $f_2(a, b)$. Here, the second function $f_2(a, b)$ may be defined as a predetermined operation for variables a and b. For example, the second function $f_2(a, b)$ may be defined as a linear combination function for the variables a and b. In this case, the discrimination index q defined based on the second function may be expressed identically or similarly to Equation 8.

$$q = f_2(q_1, q_2) = A_1 q_1 + A_2 q_2 \quad \text{[Equation 8]}$$

In Equation 8, coefficients A1 and A2 may correspond to positive integers. The definition of the discrimination index q based on Equation 8 is only an example for convenience of description, and the third exemplary embodiment of the radio signal generation method is not limited thereto.

If the first function $f_1(a, b)$ is defined as a multiplication function for the variables a and b, the second radio signal sequence $R_{q,2}(k)$ may be defined identically or similarly to Equation 9.

$$R_{q,2}(k) = f_1(R_{q_1,1}(k), R_{q_2,2}(k)) = (R_{q_1,1}(k))(R_{q_2,2}(k)), \quad k = 0, 1, \ldots, K-1 \quad \text{[Equation 9]}$$

$$R_{q_1,1}(k) = \frac{e^{\pm j\frac{\pi}{4}}}{\sqrt{2}}\{(1 - 2C_{q_1,1}(2k)) + j(1 - 2C_{q_1,1}(2k+1))\}$$

$$R_{q_2,2}(k) = \frac{e^{\pm j\frac{\pi}{4}}}{\sqrt{2}}\{(1 - 2C_{q_2,2}(2k)) + j(1 - 2C_{q_2,2}(2k+1))\}$$

$$q = f_2(q_1, q_2)$$

In Equation 9, as described with reference to the second exemplary embodiment of the radio signal generation method, each of elements of the first intermediate sequence $R_{q_1,1}(k)$ and the second intermediate sequence $R_{q_2,2}(k)$ may have one value of 1, −1, j, and −j. Accordingly, each of elements of the second radio signal sequence $R_{q,2}(k)$ defined as a product of the first intermediate sequence $R_{q_1,1}(k)$ and the second intermediate sequence $R_{q_2,2}(k)$ may have one value of 1, −1, j, and −j.

Assuming that the first intermediate index $q_1$ and the second intermediate index $q_2$ have natural integer values greater than or equal to 1 and less than or equal to $q_{max}$, the discrimination index for the second radio signal sequence $R_{q,2}(k)$ generated according to the third exemplary embodiment of the radio signal generation method may have a maximum scale of $q_{max} \times q_{max}$. In other words, the scale of the discrimination index q for distinguishing the second radio signal sequence $R_{q,2}(k)$ generated by combining two radio signal sequences (i.e., intermediate sequences) generated according to the AQPSK generation scheme may increase by $q_{max}$ times as compared to the scale (i.e., $q_{max}$) that the discrimination index for discriminating individual radio signal sequence may have. Therefore, according to the third exemplary embodiment of the radio signal generation method, the estimation performance based on the estimation signal generated based on the second radio signal sequence $R_{q,2}(k)$ can be improved. Alternatively, even when the length (or number of elements) of the base sequence is reduced, the estimation performance based on the estimation signal generated based on the second radio signal sequence $R_{q,2}(k)$ can be maintained or improved. In other words, a design that reduces the length of the base sequence while maintaining the estimation performance based on the estimation signal generated based on the second radio signal sequence $R_{q,2}(k)$ may be possible. As a result, resources (i.e., radio resources, computational resources, etc.) required for transmission and reception of the estimation signal can be effectively reduced.

In the communication system, a peak to average power ratio (PAPR) of the radio signal generated based on the second or third exemplary embodiment of the radio signal generation method may be the same as or close to a PAPR for the radio signal generated based on the first exemplary embodiment of the radio signal generation method.

For example, in the first exemplary embodiment of the radio signal generation method, the first communication node may generate the basic radio signal sequence $R_{q,c}(k)$. The basic radio signal sequence $R_{q,c}(k)$ may be generated identically or similarly to Equation 3. Based on an inverse discrete Fourier transform (IDFT) operation on the basic radio signal sequence $R_{q,c}(k)$, a signal $r_{q,c}(n)$ in the time domain may be calculated. For example, the signal $r_{q,c}(n)$ may be expressed identically or similarly to Equation 10 based on a K-point IDFT operation for the basic radio signal sequence $R_{q,c}(k)$.

$$r_{q,c}(n) = \frac{1}{\sqrt{K}}\sum_{k=0}^{K-1} R_{q,con}(k)e^{j\frac{2\pi kn}{K}}, \quad n = 0,1, \ldots, K-1 \quad \text{[Equation 10]}$$

A PAPR value $\Gamma_{q,c}(n)$ for the signal $r_{q,c}(n)$ expressed as in Equation 10 may be calculated identically or similarly to Equation 11.

$$\Gamma_{q,c} = \frac{\max\{|r_{q,c}(n)|^2\}}{\frac{1}{K}\sum_{n=0}^{K-1}|r_{q,c}(n)|^2} \quad \text{[Equation 11]}$$

Meanwhile, in the second exemplary embodiment of the radio signal generation method, the first communication node may generate the first radio signal sequence $R_{q,1}(k)$. The first radio signal sequence $R_{q,1}(k)$ may be generated identically or similarly to Equation 5 or Equation 6. Here, a relationship between the basic radio signal sequence $R_{q,c}(k)$ according to the first exemplary embodiment of the radio signal generation method and the first radio signal sequence $R_{q,1}(k)$ according to the second exemplary embodiment of the radio signal generation method may be expressed as in Equation 12.

$$R_{q,1}(k) = e^{\pm j\frac{\pi}{4}}R_{q,c}(k), \quad k = 0,1, \ldots, K-1 \quad \text{[Equation 12]}$$

Based on the K-point IDFT operation for the first radio signal sequence $R_{q,1}(k)$ expressed as in Equation 12, a signal $r_{q,1}(n)$ in the time domain may be calculated. Here, a relationship between the signal $r_{q,c}(n)$ and the signal $r_{q,1}(n)$ may be expressed as Equation 13.

$$r_{q,1}(n) = e^{\pm j\frac{\pi}{4}}r_{q,c}(n), \quad n = 0,1, \ldots, K-1 \quad \text{[Equation 13]}$$

A PAPR value $\Gamma_{q,1}(n)$ for the signal $r_{q,1}(n)$ expressed as in Equation 13 may be calculated identically or similarly to Equation 14.

$$\Gamma_{q,1} = \frac{\max\{|r_{q,1}(n)|^2\}}{\frac{1}{K}\sum_{n=0}^{K-1}|r_{q,1}(n)|^2} = \quad \text{[Equation 14]}$$

$$\frac{\max\{|e^{\pm j\frac{\pi}{4}}r_{q,c}(n)|^2\}}{\frac{1}{K}\sum_{n=0}^{K-1}|e^{\pm j\frac{\pi}{4}}r_{q,c}(n)|^2} = \frac{\max\{|r_{q,c}(n)|^2\}}{\frac{1}{K}\sum_{n=0}^{K-1}|r_{q,c}(n)|^2} = \Gamma_{q,c}$$

Referring to Equation 14, the PAPR value $\Gamma_{q,1}$ (n) for the signal $r_{q,1}$(n) generated based on the second exemplary embodiment of the radio signal generation method may be calculated as the same value as the PAPR value $\Gamma_{q,c}$ (n) for the signal $r_{q,c}$ (n) generated based on the first exemplary embodiment of the radio signal generation method.

In the communication system, the estimation operation or restoration operation based on the radio signal generated based on the second or third exemplary embodiment of the radio signal generation method may have an advantage in complexity, amount of calculation, and the like as compared to the estimation operation or restoration operation based on the radio signal generated based on the first exemplary embodiment of the radio signal generation method.

For example, according to the second exemplary embodiment of the radio signal generation method, the first communication node may generate the first radio signal based on the first radio signal sequence $R_{q,1}$(k), and transmit the generated radio signal to the second communication node. When a fading channel between the first and second communication nodes is regarded as 1, it may be assumed that there is no fading, and the Doppler frequency (or Doppler shift) may be regarded as 0. For convenience of description below, it may be assumed that the first communication node transforms the first radio signal sequence $R_{q,1}$(k) into a time domain signal, adds a cyclic prefix (CP), and transmits the signal through a radio frequency (RF), and it may be assumed that a fading channel between the first and second communication nodes is 1, and a timing and carrier frequency offset (CFO) correction are accurately performed between the first and second communication nodes. In this case, a reception result $Y_{q,1}$(k) of the first radio signal transmitted by the first communication node at the second communication node may be expressed identically or similarly to Equation 15.

$$Y_{q,1}(k)=\beta R_{q,1}(k)+N(k)=Y_{q,1,I}(k)+jY_{q,1,Q}(k),$$
$$k=0,1,\ldots,K-1. \quad \text{[Equation 15]}$$

In Equation 15, $Y_{q,1}$(k) may correspond to a reception signal received through a subcarrier k in the frequency domain. β may correspond to a coefficient (e.g., scalar value) reflecting a path loss according to a distance between the first and second communication nodes. N(k) may correspond to a noise component. $Y_{q,1,I}$(k) may correspond to a real component of $Y_{q,1}$(k). $Y_{q,1,Q}$(k) may correspond to an imaginary component of $Y_{q,1}$(k).

When the first radio signal corresponds to an estimation signal (or, reference signal for estimation), the second communication node may estimate the discrimination index q based on $Y_{q,1}$(k). The second communication node may obtain an output $Y_{q'}$ based on a correlation operation (e.g., cross-correlation operation) based on $Y_{q,1}$(k). The second communication node may obtain an estimation result for the discrimination index q (i.e., estimated discrimination index) $\hat{q}$ based on the output $Y_{q'}$. The output $Y_{q'}$ and the estimated discrimination index $\hat{q}$ may be expressed as Equation 16.

$$\gamma_{q'} = \left| \frac{1}{K}\sum_{k=0}^{K-1} Y_{q,1}(k)R^*_{q',1}(k) \right|, q' = 0,1,\ldots,q_{max}-1 \quad \text{[Equation 16]}$$

$$\hat{q} = \arg\max_{q'} \gamma_{q'}$$

In Equation 16, $q_{max}$ may mean the maximum discrimination index or the maximum number of distinguishable numbers. In an exemplary embodiment of the communication system, in order for the second communication node to estimate the discrimination index q, a complex multiplication operation such as $Y_{q,1}(k)R^*_{q',1}(k)$ may need to be performed K times for each q' in the equation expressed as Equation 16.

Meanwhile, referring to the expression of the first radio signal sequence $R_{q,1}$(k) represented by Equation 5 or Equation 6, the second communication node receiving the first radio signal generated based on the second exemplary embodiment of the radio signal generation method may not need to perform complex multiplication operations to estimate the discrimination index q. Upon receiving the first radio signal generated based on the second exemplary embodiment of the radio signal generation method, the second communication node may estimate the discrimination index q by performing operations such as component rearranging and negating without the complex multiplication operations.

Specifically, according to the second exemplary embodiment of the radio signal generation method, $R_{q',1}$(k) in Equation 16 may have a value of 1, −1, j, and −j. If $R_{q',1}$(k) is 1, $Y_{q,1}(k)R^*_{q',1}(k)$ may be $Y_{q,1}$(k). In this case, a correlation operation result for the received signal $Y_{q,1}$(k) of the subcarrier k may appear as $Y_{q,1}$(k). In this case, it may be considered that the computation amount of the estimation operation for estimation corresponds to 0.

If $R_{q',1}$(k) is −1, $Y_{q,1}(k)R^*_{q',1}(k)$ may be $-Y_{q,1}$(k). In this case, a result of a correlation operation for the reception signal $Y_{q,1}$(k) of the subcarrier k may appear as $-Y_{q,1}$(k). In this case, the second communication node may easily perform estimation through a polarity switching operation after the correlation operation for the reception signal $Y_{q,1}$(k) (or its real part and imaginary part).

If $R_{q',1}$(k) is j, $Y_{q,1}(k)R_{q',1}(k)$ may be $-Y_{q,1,Q}(k)+jY_{q,1,I}(k)$. In this case, the second communication node may easily perform the estimation by performing a component rearrangement operation and a polarity switching operation for the real component after the correlation operation for the reception signal $Y_{q,1}$(k) of the subcarrier k.

If $R_{q',1}$(k) is −j, $Y_{q,1}(k)R^*_{q',1}(k)$ may be $-Y_{q,1,Q}(k)-jY_{q,1,I}(k)$. In this case, the second communication node may easily perform the estimation by performing a component rearrangement operation and a polarity switching operation for the imaginary component after the correlation operation for the reception signal $Y_{q,1}$(k) of the subcarrier k.

That is, the discrimination index estimation operation at the second communication node receiving the first radio signal generated based on the second exemplary embodiment of the radio signal generation method may be performed by four polarity switching operations and two component rearrangement operations instead of a plurality of complex multiplication operations. Through this, the complexity or amount of computation of the operation of estimating the discrimination index q based on the first radio signal may be reduced.

On the other hand, according to the first exemplary embodiment of the radio signal generation method, the first communication node may generate the first radio signal based on the first radio signal sequence $R_{q,c}$(k), and transmit the generated radio signal to the second communication node. A reception result $Y_{q,c}$(k) of the first radio signal transmitted by the first communication node at the second communication node may be expressed identically or similarly to Equation 17.

$$Y_{q,c}(k)\beta R_{q,c}(k)+N(k)=Y_{q,c,I}(k)+jY_{q,c,Q}(k),$$
$$k=0,1,\ldots,K-1. \quad \text{[Equation 17]}$$

In Equation 17, $Y_{q,c}(k)$ may correspond to a reception signal received through a subcarrier k in the frequency domain. $Y_{q,c,I}(k)$ may correspond to a real component of $Y_{q,c}(k)$. $Y_{q,c,Q}(k)$ may correspond to an imaginary component of $Y_{q,c}(k)$.

When the first radio signal corresponds to an estimation signal (or, reference signal for estimation), the second communication node may estimate the discrimination index q based on $Y_{q,c}(k)$. The second communication node may obtain an output $Y_{q',c}$ and an estimated discrimination index q based on a correlation operation based on $Y_{q,1}(k)$. The output $Y_{q',c}$ and the estimated discrimination index q may be expressed as Equation 18.

$$Y_{q',c} = \left| \frac{1}{K} \sum_{k=0}^{K-1} Y_{q,c}(k) R^*_{q',c}(k) \right|, \; q' = 0, 1, \ldots, q_{max} - 1 \quad \text{[Equation 18]}$$

$$\hat{q} = \arg\max_{q'} Y_{q',c}$$

In an exemplary embodiment of the communication system, in order for the second communication node to estimate the discrimination index q, a complex multiplication operation such as $Y_{q,c}(k)R^*_{q',c}(k)$ may need to be performed K times for each q' in the equation expressed as Equation 18. Referring to the expression of the basic radio signal sequence $R_{q,c}(k)$ expressed as Equation 3 or Equation 4, the second communication node receiving the first radio signal generated based on the first exemplary embodiment of the radio signal generation method may need to perform real-value multiplication operations, polarity switching operations, real-value addition operations, component rearrangement operations, and the like along with a plurality of complex multiplication operations in order to estimate the discrimination index q.

Specifically, according to the first exemplary embodiment of the radio signal generation method, in Equation 18, $R_{q',c}(k)$ may have a value such as 1+j, 1−j, −1+j, −1−j or the like. If $R_{q',c}(k)$ is 1+j, $Y_{q,c}(k)R^*_{q',c}(k)$ may be $$\frac{1}{\sqrt{2}}[\{Y_{q,c,I}(k) - Y_{q,c,Q}(k)\} + j\{Y_{q,c,I}(k) + Y_{q,c,Q}(k)\}].$$

In this case, in order to estimate the discrimination index q, the second communication node may need to perform two real-value (i.e., $1/\sqrt{2}$) multiplication operations, one polarity switching operation, one real-value addition operation, and one component rearrangement operation after the correlation operation for the reception signal $Y_{q,c}(k)$ of the subcarrier k.

If $R_{q',c}(k)$ is 1−j, $Y_{q,c}(k)R^*_{q',c}(k)$ may be $$\frac{1}{\sqrt{2}}[\{Y_{q,c,I}(k) + Y_{q,c,Q}(k)\} + j\{-Y_{q,c,I}(k) - Y_{q,c,Q}(k)\}].$$

In this case, in order to estimate the discrimination index q, the second communication node may need to perform two real-value multiplication operations, one polarity switching operation, two real-value addition operations, and one component rearrangement operation after the correlation operation for the reception signal $Y_{q,c}(k)$ of the subcarrier k.

If $R_{q',c}(k)$ is −1+j, $Y_{q,c}(k)R^*_{q',c}(k)$ may be $$\frac{1}{\sqrt{2}}[\{-Y_{q,c,I}(k) - Y_{q,c,Q}(k)\} + j\{Y_{q,c,I}(k) - Y_{q,c,Q}(k)\}].$$

In this case, in order to estimate the discrimination index q, the second communication node may need to perform two real-value multiplication operations, three polarity switching operations, two real-value addition operations, and one component rearrangement operation after the correlation operation for the reception signal $Y_{q,c}(k)$ of the subcarrier k.

If $R_{q',c}(k)$ is −1−j, $Y_{q,c}(k)R^*_{q',c}(k)$ may be $$\frac{1}{\sqrt{2}}[\{-Y_{q,c,I}(k) + Y_{q,c,Q}(k)\} + j\{-Y_{q,c,I}(k) - Y_{q,c,Q}(k)\}].$$

In this case, in order to estimate the discrimination index q, the second communication node may need to perform two real-value multiplication operations, three polarity switching operations, two real-value addition operations, and one component rearrangement operation after the correlation operation for the reception signal $Y_{q,c}(k)$ of the subcarrier k.

That is, the discrimination index estimation operation at the second communication node receiving the first radio signal generated based on the first exemplary embodiment of the radio signal generation method may be performed based on eight real-value multiplication operation, eight polarity switching operations, eight real-value addition operations, and four component rearrangement operations.

The estimation operation based on the first exemplary embodiment of the radio signal generation method may require twice as many polarity switching operations and twice as many component rearrangement operations as compared to the estimation operation based on the second exemplary embodiment of the radio signal generation method. In addition, the estimation operation based on the first exemplary embodiment of the radio signal generation method may need multiple complex multiplication operations, multiple real-value multiplication operations, and multiple real-value addition operations that are not required in the estimation operation based on the second exemplary embodiment of the radio signal generation method. In other words, the estimation operation based on the second exemplary embodiment of the radio signal generation method may have very low complexity or low computation amount compared to the estimation operation based on the first exemplary embodiment of the radio signal generation method.

According to the exemplary embodiments of the present disclosure, the performance of the estimation operation or restoration operation based on radio signals transmitted and received between the transmitting node and the receiving node can be significantly improved. The receiving node receiving a radio signal can perform the estimation or restoration operation based on the radio signal without complex multiplication operations, and accordingly, complexity of calculations for the estimation or restoration operation can be reduced. According to the exemplary embodiments of the present disclosure, the total number of discriminable estimation signals may increase relative to a base sequence length. Further, the estimation signal according to the exemplary embodiments of the present disclosure has an advantage in terms of a peak to average power ratio (PAPR).

However, the effects that can be achieved by the radio signal transmission and reception method and apparatus in the communication system according to the exemplary embodiments of the present disclosure are not limited to those mentioned above, and other effects not mentioned may be clearly understood by those of ordinary skill in the art to which the present disclosure belongs from the configurations described in the present disclosure.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. An operation method of a first communication node in a communication system, the operation method comprising:
   generating a base sequence;
   performing a quadrature phase shift keying (QPSK) operation on the base sequence;
   generating a first signal sequence by performing a rotational transform operation by a first angle on a complex plane with respect to a result of the QPSK operation;
   modulating the first signal sequence to generate first modulation symbols; and
   transmitting a first signal composed of the first modulation symbols to a second communication node,
   wherein each of a plurality of elements constituting the first signal sequence has a real value or a pure imaginary value,
   wherein the first angle is one of $\pi/4$, $-\pi/4$, $3\pi/4$, or $-3\pi/4$,
   wherein the generating of the base sequence comprises:
   generating first and second binary sequences that are binary pseudo noise (PN) sequences;
   performing an element-wise exclusive-OR (XOR) operation on the first and second binary sequences; and
   obtaining the base sequence corresponding to a result of the element-wise XOR operation.

2. The operation method according to claim 1, wherein the generating of the first signal sequence comprises:
   performing an operation of multiplying a QPSK sequence obtained as the result of the QPSK operation by a first rotational transform coefficient corresponding to the first angle; and
   obtaining the first signal sequence composed of the plurality of elements each having a real value 1 or −1 or a pure imaginary value j or −j as a result of the operation of multiplying the first rotational transform coefficient.

3. The operation method according to claim 1, wherein the first signal corresponds to a reference signal for an estimation operation in the second communication node, and the base sequence corresponds to a binary pseudo-noise (PN) sequence defined based on a modulo operation between a first index related to indexes of subcarriers to which the first modulation symbols are mapped and a first estimation target variable.

4. The operation method according to claim 1,
   wherein the first signal corresponds to a reference signal for an estimation operation in the second communication node,
   wherein the first binary sequence corresponds to a binary PN sequence defined based on a modulo operation between a first index related to indexes of subcarriers to which the first modulation symbols are mapped and a first estimation target variable, and the second binary sequence corresponds to a binary PN sequence defined based on a modulo operation between the first index and a second estimation target variable.

5. An operation method of a first communication node in a communication system, the operation method comprising:
   generating first and second base sequences;
   performing a quadrature phase shift keying (QPSK) operation on each of the first and second base sequences;
   generating first and second intermediate sequences by performing a rotational transform operation by a first angle on a complex plane with respect to a result of the QPSK operation;
   performing a first operation on the first and second intermediate sequences to generate a first signal sequence;
   modulating the first signal sequence to generate first modulation symbols; and
   transmitting a first signal composed of the first modulation symbols to a second communication node,
   wherein each of a plurality of elements constituting the first signal sequence has a real value or a pure imaginary value,
   wherein the first angle is one of $\pi/4$, $-\pi/4$, $3\pi/4$, or $-3\pi/4$.

6. The operation method according to claim 5, wherein the generating of the first and second intermediate signal sequences comprises:

performing an operation of multiplying QPSK sequences obtained as the result of the QPSK operation by a first rotational transform coefficient corresponding to the first angle; and obtaining the first and second intermediate sequences each composed of a plurality of elements each having a real value 1 or −1 or a pure imaginary value j or −j as a result of the operation of multiplying the first rotational transform coefficient.

7. The operation method according to claim 5, wherein each of the first and second intermediate sequences is composed of a plurality of elements each having a real value 1 or −1 or a pure imaginary value j or −j, and the generating of the first signal sequence comprises:

performing an element-wise multiplication operation on the first and second intermediate sequences; and obtaining the first signal sequence corresponding to a result of the element-wise multiplication operation.

8. The operation method according to claim 5, wherein the generating of the first and second base sequences comprises:

generating the first base sequence defined based on a first intermediate index; and generating the second base sequence defined based on a second intermediate index, wherein a first signal index for identifying the first signal sequence is determined based on a linear combination of the first and second intermediate indexes.

9. The operation method according to claim 5, wherein the generating of the first and second base sequences comprises:

generating the first base sequence based on first and second binary sequences; and generating the second base sequence based on third and fourth binary sequences, wherein all of the first to fourth binary sequences are different from each other.

10. The operation method according to claim 5, wherein the generating of the first and second base sequences comprises:

generating the first base sequence based on first and second binary sequences; and generating the second base sequence based on third and fourth binary sequences, wherein at least part of the first to fourth binary sequences are identical to each other.

11. A first communication node in a communication system, comprising a processor, wherein the processor causes the first communication node to perform:

generating one or more binary sequences based on information to be transmitted to a second communication node;

performing a quadrature phase shift keying (QPSK) operation on each of the one or more binary sequences;

generating a first signal sequence based on a rotational transform operation by a first angle on a complex plane with respect to a result of the QPSK operation;

modulating the first signal sequence to generate first modulation symbols; and transmitting a first signal composed of the first modulation symbols to a second communication node, wherein each of a plurality of elements constituting the first signal sequence has a real value or a pure imaginary value, wherein the first angle is one of $\pi/4$, $-\pi/4$, $3\pi/4$, or $-3\pi/4$.

12. The operation method according to claim 11, wherein a number of the one or more binary sequences is one, and in the generating of the first signal sequence, the processor causes the first communication node to perform:

performing an operation of multiplying a QPSK sequence obtained as the result of the QPSK operation on the one binary sequence by a first rotational transform coefficient corresponding to the first angle; and obtaining the first signal sequence composed of a plurality of elements each having a real value 1 or −1 or a pure imaginary value j or −j as a result of the operation of multiplying the first rotational transform coefficient.

13. The operation method according to claim 11, wherein the one or more binary sequences include first and second binary sequences, and in the generating of the first signal sequence, the processor causes the first communication node to perform:

performing an operation of multiplying each of QPSK sequences obtained as the result of the QPSK operation on the first and second binary sequences by a first rotational transform coefficient corresponding to the first angle; and obtaining first and second intermediate sequences each composed of a plurality of elements each having a real value 1 or −1 or a pure imaginary value j or −j as a result of the operation of multiplying the first rotational transform coefficient.

14. The operation method according to claim 13, wherein each of the first and second intermediate sequences is composed of a plurality of elements each having a real value 1 or −1 or a pure imaginary value j or −j, and in the generating of the first signal sequence, the processor causes the first communication node to perform:

performing an element-wise multiplication operation on the first and second intermediate sequences; and obtaining the first signal sequence corresponding to a result of the element-wise multiplication operation.

* * * * *